BONDING

Original Filed Oct. 27, 1964

INVENTORS
THEODORE L. OBERLE
MARION R. CALTON
CALVIN D. LOYD
CLAUDE F. WHITE
BY
Fryer & Tjensvold
ATTORNEYS INVENTORS.
THEODORE L. OBERLE
MARION R. CALTON
CALVIN D. LOYD
BY CLAUDE F. WHITE
Fryer & Tjensvold
ATTORNEYS

FIG. 4

| PARTS JOINED | | | | INERTIA | INERTIA | | | TOTAL | | AVERAGE | PRESSURE |
|---|---|---|---|---|---|---|---|---|---|---|---|
| MAT'L SAE NO. | SIZE | MAT'L SAE NO. | SIZE | MASS LBS. | MASS LB. FT.² | R.P.M. | TIME SEC. | ENERGY FT. LBS. | PRESS. P.S.I. | H.P. PER IN.² | BUILD-UP TIME-SEC. |
| 1020 | 0.75 IN. DIA. BAR | 1020 | 0.75 IN. DIA. BAR | 80 | 7.36 | 2,000 | 0.60 | 4,525 | 13,130 | 31.0 | 0.60 |
| 1045 | 1.0 IN. DIA. BAR | 1045 | 1.0 IN. DIA. BAR | 200 | 17.96 | 1,950 | 0.58 | 9,840 | 17,100 | 39.0 | 0.06 |
| 1045 | 1.0 IN. DIA. BAR | 1045 | 1.0 IN. DIA. BAR | 80 | 7.36 | 3,275 | 0.87 | 12,126 | 16,540 | 32.2 | 0.60 |
| 1040 | 2.0 IN. DIA. BAR | 1040 | 2.0 IN. DIA. BAR | | 842.00 | 800 | 2.58 | 74,500 | 12,700 | 16.7 | 0.60 |
| 1045 | 2.0 IN. DIA. BAR | 1045 | 2.0 IN. DIA. BAR | | 1337.00 | 600 | 1.99 | 73,500 | 25,400 | 21.3 | 0.05 |
| 1020 | 2.5 IN. DIA. BAR | 1020 | 2.5 IN. DIA. BAR | | 842.00 | 900 | 2.10 | 105,000 | 17,300 | 18.5 | 0.60 |
| 1049 | 5.562 DIA. *3 | 1049 | 5.562 DIA. | | 1060.00 | 1,000 | 2.20 | 163,000 | 21,300 | 20.4 | 0.60 |
| 1020 | 1.0 IN. DIA. BAR | 1020 | 1.0 IN. DIA. BAR | 80 | 7.36 | 2,500 | 0.49 | 6,490 | 16,900 | 30.6 | 0.60 |
| 5120 | 1.812 DIA. *1 | 5120 | 1.812 DIA. | 200 | 17.96 | 2,100 | 0.68 | 13,550 | 16,200 | 38.1 | 0.60 |
| 8630 | 1.0 IN. DIA. BAR | GMR 235 *2 | 1.0 IN. DIA. BAR | 200 | 17.96 | 2,185 | 1.39 | 9,560 | 19,550 | 16.0 | 1.30 |
| 1020 | 0.75 IN. DIA. BAR | 1020 | 0.75 IN. PLATE | 80 | 7.36 | 2,610 | 0.503 | 6,154 | 13,640 | 50.4 | 0.055 |
| 1045 | 1.0 IN. DIA. BAR | 1045 | 1.0 IN. DIA. BAR | 80 | 7.36 | 3,000 | 0.40 | 9,130 | 22,400 | 53.0 | 0.073 |
| 1020 | 0.75 IN. DIA. BAR | 1020 | 0.75 IN. PLATE | 200 | 17.96 | 3,000 | 2.90 | 17,000 | 10,300 | 23.8 | 0.038 |
| ALUMINUM | 1.0 IN. DIA. BAR | ALUMINUM | 1.0 IN. DIA. BAR | 80 | 7.36 | 2,145 | 0.507 | 3,870 | 8,950 | 17.7 | 0.045 |
| BRONZE | 1.0 IN. DIA. BAR | BRONZE | 1.0 IN. DIA. BAR | 80 | 7.36 | 2,750 | 0.503 | 7,010 | 16,350 | 30.7 | 0.53 |
| 1040 | 1.0 IN. DIA. BAR | 1040 | 1.0 IN. DIA. BAR | 80 | 7.36 | 3,000 | 0.46 | 8,012 | 10,000 | 43.0 | 0.07 |
| 1035 | 1.062 DIA. *4 | HS31 ALLOY | 0.94 DIA. *5 | | 122.00 | 750 | 1.50 | 11,600 | 45,000 | 31.6 | 0.40 |
| 1035 | 1.0 DIA. *4 | 713C ALLOY | 0.94 DIA. *5 | | 76.00 | 850 | 1.50 | 9,300 | 45,000 | 25.3 | 0.40 |

*1 STEEL TUBING - 1.438 I.D.
*2 GENERAL MOTORS RESEARCH ALLOY
*3 TUBING - 4.75 I.D.
*4 TUBING - 0.50 I.D.
*5 TUBING - 0.56 I.D.

INVENTORS
THEODORE L. OBERLE
MARION R. CALTON
CALVIN D. LOYD
CLAUDE F. WHITE
BY Fryer & Tjensvold
ATTORNEYS

BONDING

BONDING

2000 RPM
70 LBS. UPSET

2500 RPM
70 LBS. UPSET

2250 RPM
70 LBS. UPSET

2000 RPM
80 LBS. UPSET

INVENTORS.
THEODORE L. OBERLE
MARION R. CALTON
CALVIN D. LOYD
CLAUDE F. WHITE
BY Fryer & Tjensvold
ATTORNEYS INVENTORS
THEODORE L. OBERLE
MARION R. CALTON
CALVIN D. LOYD
CLAUDE F. WHITE
BY
Fryer + Tjensvold
ATTORNEYS

BONDING

INVENTORS
THEODORE L. OBERLE
MARION R. CALTON
CALVIN D. LOYD
CLAUDE F. WHITE
BY Fryer + Tjensvold
ATTORNEYS

INVENTORS
THEODORE L. OBERLE
MARION R. CALTON
CALVIN D. LOYD
CLAUDE F. WHITE

BY Fryer + Tjensvold
ATTORNEYS

BONDING

Original Filed Oct. 27, 1964

INVENTORS
THEODORE L. OBERLE
MARION R. CALTON
CALVIN D. LOYD
CLAUDE F. WHITE
Fryer + Tjensvold
ATTORNEYS INVENTORS.
THEODORE L. OBERLE
MARION R. CALTON
CALVIN D. LOYD
BY CLAUDE F. WHITE
Fryer & Tjensvold
ATTORNEYS INVENTOR.
THEODORE L. OBERLE
MARION R. CALTON
CALVIN D. LOYD
CLAUDE F. WHITE
BY
Fryer & Tjensvold
ATTORNEYS INVENTORS.
THEODORE L. OBERLE
MARION R. CALTON
CALVIN D. LOYD
BY CLAUDE F. WHITE
Fryer & Tjensvold
ATTORNEYS INVENTORS.
THEODORE L. OBERLE
MARION R. CALTON
CALVIN D. LOYD
BY CLAUDE F. WHITE
Fryer & Tjensvold
ATTORNEYS INVENTORS.
THEODORE L. OBERLE
MARION R. CALTON
CALVIN D. LOYD
CLAUDE F. WHITE
BY Fryer & Tjensvold
ATTORNEYS INVENTORS.
THEODORE L. OBERLE
MARION R. CALTON
CALVIN D. LOYD
BY CLAUDE F. WHITE
Fryer & Tjensvold
ATTORNEYS INVENTORS
THEODORE L. OBERLE
MARION R. CALTON
CALVIN D. LOYD
BY CLAUDE F. WHITE
Fryer & Tjensvold
ATTORNEYS April 1, 1969 T. L. OBERLE ET AL 3,435,510

BONDING

Original Filed Oct. 27, 1964 Sheet 17 of 17

INVENTORS
THEODORE L. OBERLE
MARION R. CALTON
CALVIN D. LOYD
CLAUDE F. WHITE
BY Fryer & Tjensvold
ATTORNEYS 3,435,510
BONDING Theodore L. Oberle, Washington, Marion R. Calton, East Peoria, Calvin D. Loyd, Peoria, and Claude F. White, Creve Coeur, Ill., assignors to Caterpillar Tractor Co., Peoria, Ill., a corporation of California Application Oct. 27, 1964, Ser. No. 407,955, now Patent No. 3,273,233, dated Sept. 20, 1966, which is a continuation-in-part of application Ser. No. 212,178, July 9, 1962, which in turn is a continuation-in-part of application Ser. No. 146,710, Oct. 23, 1961. Divided and this application June 30, 1966, Ser. No. 563,632
Int. Cl. B23k 31/02
U.S. Cl. 29—470.3 1 Claim

ABSTRACT OF THE DISCLOSURE

A method of friction welding wherein tabs are formed on one of the workpieces to connect same to an inertial mass and to permit the disconnecting of the mass from the workpiece by shearing off the tabs in response to a predetermined torque.

This application is a division of our copending application Ser. No. 407,955, filed Oct. 27, 1964, now Patent No. 3,273,233, issued Sept. 20, 1966, which is a continuation-in-part of our application Ser. No. 212,178, filed July 9, 1962, now abandoned. Application Ser. No. 212,178 is a continuation-in-part of our application Ser. No. 146,710 filed Oct. 23, 1961, now abandoned.

This invention relates to process and apparatus for forming bonds in articles and to articles produced by the bonding process. The present invention has particular application to a process in which two or more members to be joined are engaged under pressure and the engaged surfaces are heated to a bonding temperature by friction and plastic working produced by relative motion at the engaged surfaces.

Until recent years the majority of metal joining processes having significant commercial application could be placed in one of three categories—pressure processes, including forging and resistance welding techniques such as upset and flash butt welding; non-pressure processes, also known generally as fusion welding, including arc and gas welding; and brazing processes. In the past few years a serious need has developed for both higher strength bonds and bonds between materials which have been difficult or impossible to bond by existing techniques. Thus, for example, one of the problems presented by arc or gas welding is that of coarse grained and dendritic structures in the weld area which detract from the mechanical properties of the materials joined. Arc and gas welding are also limited to joining materials within a limited range of atomic diameters; a steel part cannot be joined to a titanium part because the difference in the atomic diameters is too great.

It is a primary object of the present invention to bond parts, including parts composed of dissimilar metals (metalloids) and inorganics, with a bond that achieves the full strength of a parent part being joined. It is a related object to bond parts having large differences in atomic diameters.

One of the more important processes to which much attention has recently been given is the friction welding process. Some features of this process are quite old, but, largely as the result of recent Russian publication of work attributed to V. I. Vill, new interest and activity are developing in the process. The friction welding process as employed in acordance with Russian teachings is a sequential process in which the parts to be joined are first engaged under pressure at a common interface and rotated relative one another to bring the interface to a certain temperature level and to certain conditions of sliding friction at the interface. The rotation is then stopped as quickly as possible, usually by braking or by reversing the torque applied by an electric motor, to keep the rotating masses from breaking a bond after it is partly formed. An increased axial force is then applied to produce an upset pressure effective to squeeze out a substantial amount of flash at the interface area and to form the bond as the parts cool. As the parts to be bonded increase in size larger and heavier motors and associated drive equipment are required to furnish the power and larger braking equipment and related control systems are needed to bring the parts to a stop.

In this friction welding process the heat is applied at a rate which permits a significant amount of the heat to dissipate into the parts beyond the immediate area to be bonded. As a result, it is difficult to form a strong bond of a bar to a part, such as heavy steel plate, having a large mass near the interface for drawing heat quickly away from the interface. A certain amount of time is required to bring the rotating part or parts to rest before the upsetting pressure is applied, and the parts must therefore be heated above the required bonding temperature to allow for some cooling of the parts during the time that rotation is being stopped. As a result of the rate at which the heat is applied and the total amount of heat which is supplied, a considerable amount of each part is heated to a plastic state. The axial pressure needed to form the bond forces the plastic material radially outwardly from the interface area, producing a large amount of flash. This is of course wasteful of material but is an unavoidable consequence of the manner of applying the heat and pressure. The upset or compacting pressure applied after stopping is used to squeeze out of the bond area the oxides that are produced by the relatively long period of heating at relatively high temperatures. The large amount of flash produced makes dimensional accuracy difficult to maintain. The large amount of heat applied also causes gain growth with resulting loss of desired mechanical properties in the heat affected zone. In many cases it is necesary to heat treat the bonded parts to effect some refinement of the enlarged grain. The benefits which can be realized by heat treatment are limited, and even under the best of conditions such subsequent heat treatment often cannot restore or make up for all the mechanical properties lost in the heat affected zone.

The method of the present invention is essentially a single, continuous operation. Two or more parts to be joined are pressed together at an interface and moved relative to one another while the pressure of engagement is very rapidly built up to convert mechanical energy to heat at the interface. The rate of pressure build-up and application of the energy is so quick that the heat is concentrated at the interface with a steep temperature gradient on each side of the interface until the bond is formed. No auxiliary braking, sensing, limiting or compensating equipment or controls are required. Intead, a predetermined limited amount of energy is quickly imparted to the parts, and the resistance to plastic working developed at and adjacent the interface as the bond forms, stops relative movement of the parts as soon as the input of energy ends.

The total energy needed to produce the bond is developed before the parts are engaged. The process can proceed to completion without the need to wait for development of more energy at any stage during the process.

The present invention concentrates a minimal amount of energy at the interface and thereby minimizes the extent of the areas heated to a plastic state and the time at a temperature at which grain growth can occur. This is accomplished by controlling the power input as well as the total amount of energy applied. By applying a small amount of energy quickly and under high pressure, the present invention also substantially excludes air and thereby minimizes the formation of oxides in the interface. What oxides do exist are dissolved or fragmented and dispersed through the interface and flash by the forces applied.

The amount of extruded material can be closely controlled and in many cases reduced to an insignificant amount or eliminated entirely. This in turn permits greatly improved dimensional control.

Because the heat is applied in a manner to concentrate the heat at the interface and prevent dissipation away from the interface until after the bond is formed, the bonding method of the present invention is not dependent on the mass of the part available to draw heat away from the bond zone so that articles of varied configuration can be readily bonded together. For example, a small stud can readily be bonded to a thick plate. A strong bond between two articles of this kind has been difficult to achieve with the prior art friction welding process.

The present invention makes it possible to readily and economically join dissimilar materials. It is therefore practical to fabricate composite products having specific physical characteristics at the particular locations desired.

It is another object of the present invention not only to heat rapidly but also to cool the heat affected area rapidly. Use is made of the relatively large mass of unheated area to extract heat very rapidly from the small mass of the heat affected zone after the bond is formed. Thus, the unheated mass effects a severe quench of the heated area without auxiliary cooling techniques. This is especially important in the case of steels, to produce structures having the improved mechanical properties obtained by severe quenching operations.

It is another object of the present invention to work the material participating in the bond right up to the time it is cooled to obtain a bonded product having distinct grain refinement throughout the heat affected zone. No subsequent heat treatment is needed. It is a related object to orient the material heated to a plastic state to obtain strength and fatigue resistance properties superior to those produced by existing bonding techniques. This object is achieved by the manner in which the heat an forces are applied. A bonded product produced by the present invention has a narrow heat affected zone, with refined grain throughout, and an abrupt transition between the displaced and non-displaced material.

In one embodiment of apparatus for practicing the present invention, a selected amount of energy is stored in a rotating inertial mass. This mass is located close to the interface and is rigidly associated with a part to be bonded to minimize elastic wind-up. Inertial masses elsewhere in the rotating system are maintained sufficiently small in comparison to the control mass to prevent the inertia of such other masses from having a significant effect on the formation of the bond. The energy stored in the rotating mass supplies the heat energy for the bond when two or more parts are engaged in rubbing contact under pressure at their interface. The stored energy also produces extensive plastic working at low speed after the bond is formed. The size of the flywheel, pressure and rate of pressure build-up are selected to take the interface rapidly to and through an initial peak power input and to bring the interface to a plastic condition. While the interface is in this plastic condition, the speed decreases to a critical speed at which the interface can bond under the forces applied. The bond forms across the entire interface as the speed of relative rotation drops to this critical speed. The bond is formed while the mass is still rotating and while a substantial amount of the stored energy is retained in the rotating mass. This remaining energy is put into the bond zone through rotational straining of the material in the bond zone and heavy plastic working. The intense local working produced by the resultant effect of torque and moderate load during rotation after the bond has formed forges the material in the bond area and ejects coherent flash from the bond zone to clean the bond zone and contributes beneficial characteristics to the bond area. This embodiment of the invention makes it possible to bond large parts with apparatus of low power since the energy can be accumulated in the rotating mass. A method and apparatus using an inertial mass effective to function in this manner to produce the results described constitute further objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claim.

In the drawings:

FIG. 4 is a chart giving data for forming bonds in accordance with the present invention with the materials and part sizes listed;

Figure 1:
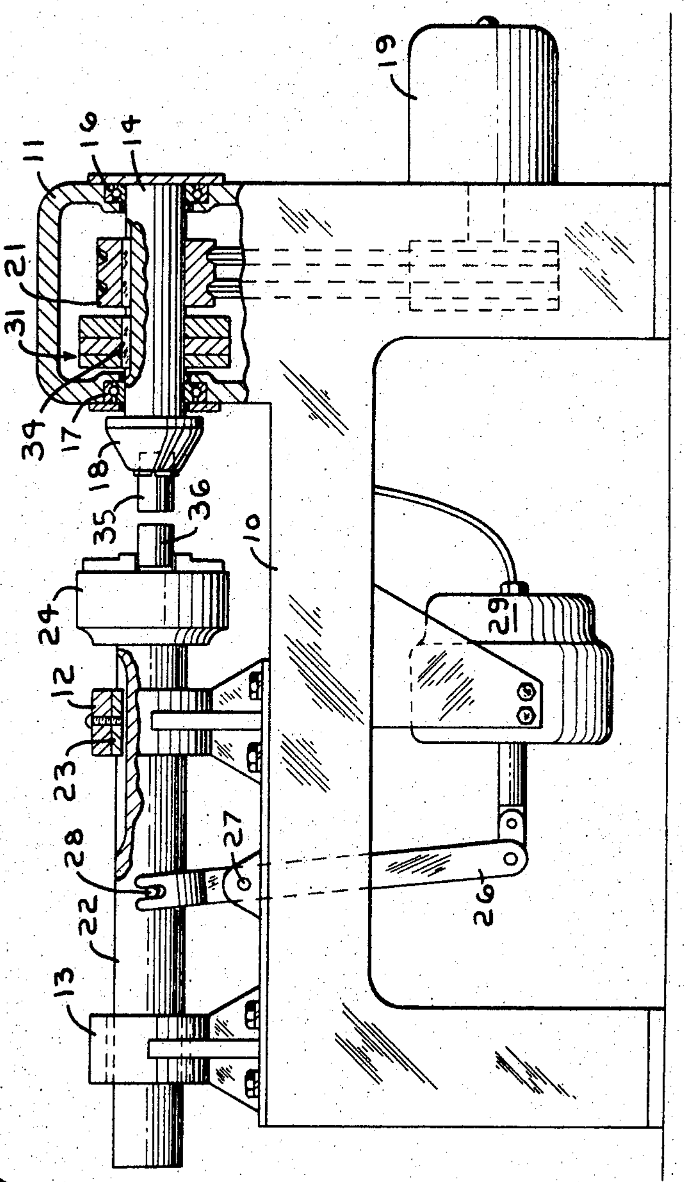
FIG. 1 is a front elevational view, partially broken away in parts to show details of construction, of one embodiment of apparatus constructed in accordance with and effective to perform the present invention.

In FIG. 1 apparatus constructed in accordance with one embodiment of the present invention is shown as a machine having a frame like that of a lathe with a bed 10 having a headstock 11 at one end and a tailstock in the form of spaced bearings 12 and 13 at the other end. A headstock spindle 14 is rotatable in bearings 16 and 17 and carries a chuck 18 at one end. The chuck 18, herein shown as a collet chuck, may be of any suitable type depending upon the workpiece to be held. A motor 19 drives the headstock spindle through conventional belt and pulley means including a pulley 21 keyed to the spindle. The tailstock bearings 12 and 13 support a reciprocable tailstock spindle 22 keyed against rotation in one of the bearings as illustrated at 23. This spindle carries a chuck 24 herein shown as a face or jaw-type chuck which, again, may be of any suitable type depending upon the nature of the workpiece to be held thereby.

The tailstock spindle as advanceable toward the headstock spindle by means herein shown as a lever 26 pivotally supported with respect to the machine bed at 27 and having a forked upper end embracing pins, one of which is shown at 28 on the spindle. Advancing of the tailstock spindle can be accomplished with any suitable power means herein illustrated as a pneumatic roto-chamber 29 suitably supported beneath the bed of the machine and adapted to be activated in a well known manner by controls (not shown) for charging it with air under pressure from a suitable source of supply.

Figure 2:
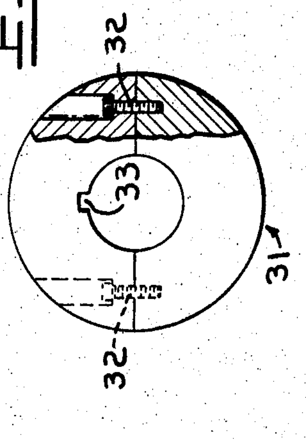
FIG. 2 is an elevation view of an inertial weight, with a portion shown in section, used in the apparatus shown in FIG. 1.

The headstock spindle is provided with an inertial mass generally indicated at 31 which may be in the form of a plurality of disc-like weights removably secured against rotation with respect to the spindle. An example of one of such weights is shown in FIG. 2 wherein it is illustrated as formed in separable halves adapted to be secured together as by cap screws 32 and having a keyway 33 for reception of a key shown at 34 in FIG. 1 which fits within a suitable key slot in the headstock spindle.

In practicing the invention, a workpiece, such as shown at 35, is held in the headstock chuck and a workpiece 36 is held in the tailstock chuck. To bond the workpieces together, the motor 19 is started to bring the headstock spindle 14 and inertial mass 31 thereon to a predetermined speed of rotation, the value of which depends upon the size and shape of the parts to be bonded, their composition and the weight of the inertial mass. The roto-chamber 29 is then activated to bring the stationary workpiece 36 into contact with the rotating workpiece 35 with sufficient force to bring the parts to bonding temperature due to friction at the engaging surfaces of the workpieces and to supply upsetting pressure at the same time as the inertial mass expends its energy and rising torque extrudes flash and the headstock spindle comes to rest. At this time, a bond is formed between the workpieces, pressure in the roto-chamber is relieved and the bonded workpieces are removed from the chucks.

Due to the fact that the motor is not relied upon for imparting rotation to one of the workpieces while it is in frictional contact under pressure with the other workpiece, a relatively high speed of rotation can be obtained with a very small motor and this high speed of the parts which include the inertial mass produces bonding temperatures in a remarkably short period of time. Because of the variation in the size and nature of the material or parts to be bonded, the speed of rotation, the weight and radius of gyration of the inertial mass and the pressure between the parts is calculated for each different type of bond to be made. The following is an example of conditions which will produce a perfect bond between two steel rods of one inch diameter:

| | | |
|---|---|---|
| Speed | r.p.m. | 2,000 to 3,000 |
| Pressure | p.s.i. | 8,000 to 12,000 |
| Inertial mass | lbs. | 80 |

The bond formed in accordance with the above described method and between the ends of two one-inch steel bars is produced in approximately one second of frictional contact time as compared to thirty seconds or longer in the prior art friction welding methods. This short duration of the heating cycle reduces distortion of the parts being bonded, thus reducing subsequent machining of flash. It also eliminates grain growth which results from a longer heating cycle. Due to the shortness of the heating cycle, the time for conduction of heat away from the interface prior to formation of the bond is so limited that a rod-like part may be bonded to a plate or other large part of any thickness. Furthermore, a clean bond is formed because the limited heating cycle and high pressures employed minimize oxidation or inclusion in the heated metal and this results in a minimum of flashed or extruded metal so that dimensional control is improved and waste material is held to a minimum. The use of this inertial process also eliminates the need for a complicated control system which is required in the prior art friction welding processes to control and sequence the time of friction rubbing, to alter the upset pressure and disengage the clutch and apply the brake.

In the present method it is even unnecessary to stop the motor as it will be stalled by the frictional drag and the formation of the weld. It is of course possible however, to de-energize the motor automatically when the inertial mass attains a desired speed and other automatic controls may be added to the apparatus herein disclosed depending upon the size and type of parts being welded.

While the inertial mass is illustrated as having parts separable from the headstock spindle, it may be a single fixed weight where a machine is used for welding only one combination of parts. In some cases, as with small parts, the weight of the spindle and chuck may suffice, and in other cases, a larger or weighted chuck may serve as the mass.

Figure 3:
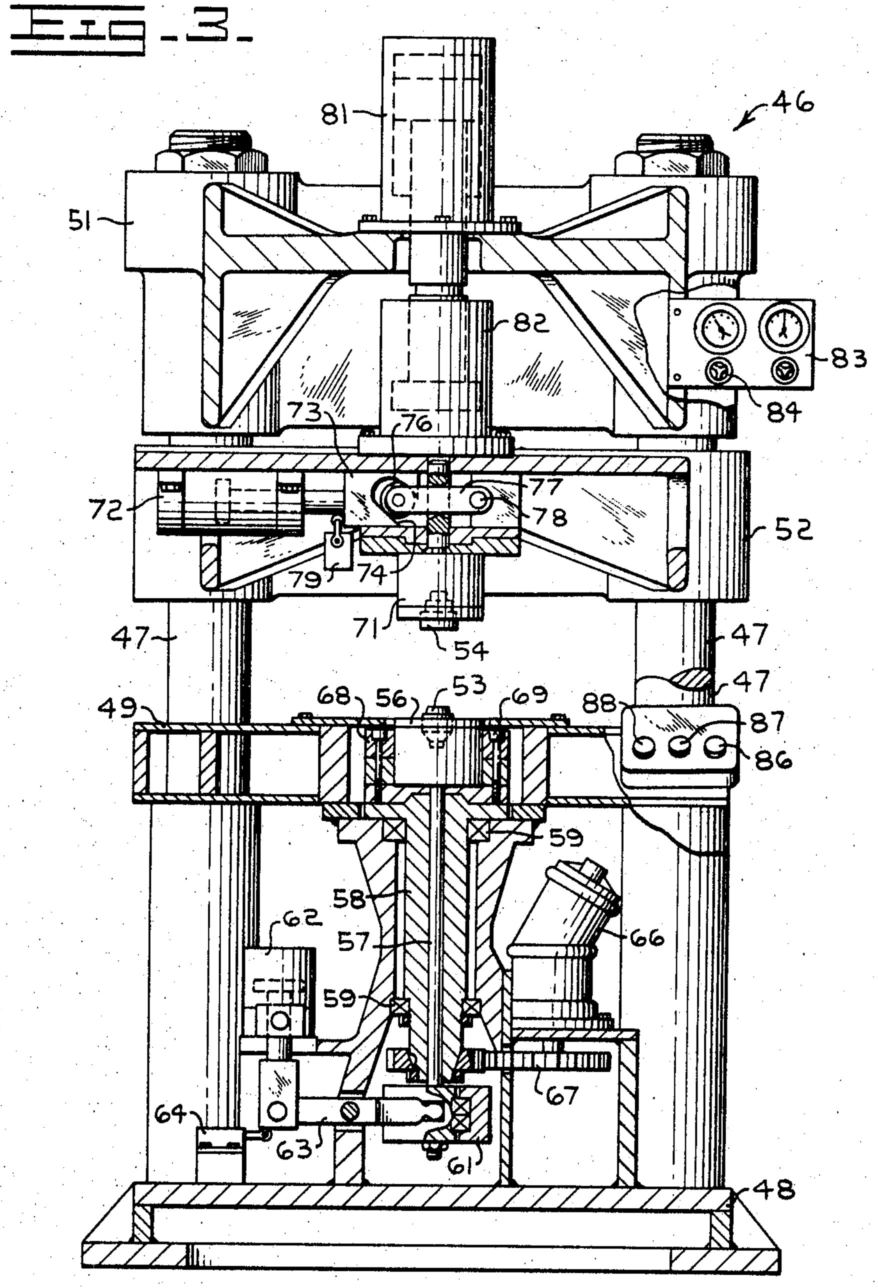
FIG. 3 is an elevation view, partially broken away in parts, of another embodiment of apparatus constructed in accordance with and effective to perform the present invention.

In FIG. 3 another embodiment of a machine constructed in accordance with the present invention is indicated generally by the reference numeral 46. In this instance the machine 46 is similar to a conventional press and is adapted to be semi-automatic in operation. The machine 46 includes four rectangularly spaced posts 47 extending upwardly from a machine base 48 to support a work table 49 and a rigidly secured head 51. A movable press head 52 is slidably supported on posts 47 intermediate the work table 49 and the upper head 51.

The machine 46 is shown in FIG. 3 with the operating parts in the positions they occupy just prior to the application of bonding forces to two parts to be joined. A workpiece 53 is clamped in a lower chuck 56, after a finished article has been removed from this chuck at the conclusion of a preceding bonding operation. A tie bar 57 extends downwardly from chuck 56 through a spindle 58 journalled for rotation in bearings 59. The lower end of the tie bar 46 is rotatably mounted within a collar 61 which is moved up and down by a jack 62 through a lever 63. Retraction of the jack 62 clamps the workpiece 53 within the chuck 56 while extension of the jack 62 releases the workpiece. A microswitch 64 is positioned to be closed on retraction of the jack 62.

The machine 46 includes means for developing a controlled limited amount of energy to be applied as heat at the interface of the workpieces, and these means comprise a hydraulic motor 66 connected to drive the spindle 58 through gears 67, together with weights 68 rigidly secured for rotation with the chuck 56 by bolts 69. It is also desirable that the weights 68 be positioned closely adjacent the interface to minimize problems of elastic wind-up.

A workpiece 54 is clamped to an upper chuck 71 by a jack 72 having an enlarged head 73 formed with an inclined ramp 74 effective to raise a roller 76 and lever 77 about pivot 78 when the jack 72 is extended. A microswitch 79 is mounted adjacent the head 73 and is closed when the jack 72 is retracted.

In this instance the chuck 71 is non-rotatably mounted in the movable head 52. The vertical position of the head 52 is under the control of two in line jacks 81 and 82, which when extended as described below, serve as means for converting the energy stored in the rotating weights 68 to heat at the interface of the workpieces 53 and 54.

The machine 46 includes means for controlling the time heat is applied to the interface to form the bond substantially simultaneously with the ending of the heat input. These control means include a tachometer 83 for sensing the speed of rotation of the chuck 56 and workpiece 53 and a pressure regulating valve 84 for controlling the pressure with which the workpieces 53 and 54 are engaged under the control of the jacks 81 and 82.

A series of control buttons 86, 87 and 88 are disposed near the work table 49 and are effective in combination with the pressure regulator 84 and speed sensing techometer 83, to coordinate the application of the energy stored in the rotating weights 68 with the axial force exerted by the jacks 81 and 82.

In operation, and with the parts disposed in the positions illustrated in FIG. 3 at the conclusion of a bonding operation, the operator first inserts a workpiece 54 in the chuck 71 and pushes button 88 to extend the jack 72 and clamp the workpiece in the chuck 71. Pushing button 88 also extends jack 62 to unclamp chuck 56 so that the article bonded by the immediately preceding cycle of operation can be removed from this chuck. The operator then places a workpiece 53 in the chuck and pushes the button 87 to retract the jack 62 and clamp the new workpiece in the chuck. Retraction of the jack 62 closes microswitch 64 which energizes a solenoid (not illustrated) to direct fluid to motor 66 to start rotation of the spindle 58, chuck 56, weights 68 and workpiece 53. The closing of microswitch 64 also directs fluid to the upper jack 81 to extend this jack. When the jack 81 is fully extended, the workpieces 53 and 54 are separated by about one-half inch. As soon as the spindle 58 reaches a predetermined speed corresponding to the desired amount of energy to be imparted to the workpieces 53 and 54, the tachometer 83 de-energizes the solenoid supplying fluid to the motor 66, at which time the motor 66 free-wheels, and directs fluid to the lower jack 82, causing the workpieces to be engaged under the pressure selected by the control valve 84.

The bond is formed between the workpieces 53 and 54 as the friction and plastic working developed at the interface convert the energy stored in the rotating weights 68 to heat at the interface. When the parts come to rest at the conclusion of the bonding operation, the tachometer 83 senses the stopping of the spindle 58 and positions a valve to retract the jack 72. This unclamps the chuck 71 and closes the switch 79. Closing of switch 79 causes retraction of the jacks 81 and 82 and returns the parts of the machine 46 to the position illustarted in FIG. 3 with the bonded article clamped in the lower chuck 56. This concludes one cycle of operation.

Machine 46 is rigidly constructed and thus is capable of high precision. It is semi-automatic in operation and is intended for volume production of bonded articles. It will be apparent that this machine could be readily adapted for completely automatic operation by the incorporation of a magazine feed and automatic ejection in the event this type of operation were desired.

While the machines illustrated in FIGS. 1 and 3 are both stationary, the present invention also has application to portable machines adapted to be powered from any conventional electrical or pneumatic power source. Thus, a machine constructed in accordance with the present invention can be in the form of a lightweight, portable, electrical powered machine using an inertial weight rotated at high speed to accumulate sufficient energy to bond articles requiring fairly substantial applications of heat energy, for example, studs to heavy plate.

It should also be noted, as will become more apparent from the description to follow, that the present invention can be practiced by apparatus other than that using inertial weights to store energy. In this event, the apparatus should incorporate drive means for imparting a selected, limited amount of energy under a pressure build-up and in a controlled time interval sufficiently short to concentrate the heat at the interface. The apparatus may also preferably include means for producing prolonged rotational plastic working below a critical speed at which the interface bonds.

The use of inertial weights, however, has the advantage of offering economy of power; and this becomes increasingly important as the parts to be bonded increase in size. Thus, the use of inertial weights enables motors of low power to be used to store and to accumulate the amount of energy needed to form the bond and avoids the necessity of using large and costly motors.

The use of inertial weights makes it convenient to regulate the amount of energy put into the parts to be bonded and therefore helps achieve uniform results. Little operator skill is required. The amount of energy required can be determined from the materials to be bonded and the part sizes and a proper speed and weight combination selected.

FIG. 4 lists representative data based on bonds formed in the materials and with the part sizes listed. The data set forth in FIG. 4 were developed from bonding operations in which the maximum bonding pressures applied were generally less than one-half of the yield strength of the materials bonded. Working closer to the yield strength produces bonds having smaller heat affected zones in time intervals significantly less than those listed in FIG. 4.

It is also recognized that the use of substantially higher pressures (near the yield strength of the material) can reduce the temperature required at the interface to produce a high strength bond. This can be especially significant in materials having high thermal conductivity in which it is difficult to retain the high interface temperature required to permit the formation of a satisfactory bond with relatively low pressures. The use of relatively higher pressures also provides higher quality bonds between dissimilar materials having substantially different melting temperatures in which it is difficult to obtain sufficient temperature in the higher strength high melting temperature materials to produce a satisfactory bond with relatively low pressures.

In the method of the present invention a predetermined limited amount of energy is applied to the interface at a rate of application sufficiently fast to bring the interface to a bondable temperature with the heat concentrated at the interface and steep temperature gradients on each side of the interface. The workpieces are engaged under an axial pressure which acts in coordination with the application of the energy at the interface, to displace from the interface excess material heated to a plastic state before any bulk quantity of the material is heated to a molten state by excess energy. This maintains the heat concentrated at the interface and prevents the development of fused material at the interface. The application and termination of the energy input are effective to refine below normal grain size all material heated to a condition at which grain growth can occur, and further, to cause chilling below the recrystallization temperature of the grain in the refined state by the non-heat affected portions of the members on normal cooling of the bonded workpieces in the atmosphere.

Products produced by the method of the present invention exhibit mechanical properties which are significantly superior to the mechanical properties produced in products made by prior art methods. This results in a large measure from applying less total energy quicker and under different conditions of pressure and plastic working than has been done before.

Several theories can be presented for explaining the improved results in products of the present invention as compared to products produced by prior art processes, and available techniques of analysis seem to substantiate these theories.

Thus, the forces applied produce conditions of heating and plastic working which combine to force the engaged surfaces into intimate engagement to eliminate the last few percent of microvoids at the interface. The short time during which the energy is applied affords little opportunity for the formation of contaminations by air during the bonding operation. The intense local working fragments disperse throughout the interface any non-metallic inclusions that do exist in the interface area. As is well known in aluminum alloys, intense local working can produce dispersions of fragmented inclusions in sufficient numbers and sufficiently favorably oriented to produce dispersion strengthening by very small sub-microscopic particles. Applying a small amount of energy quickly localizes the area heated to a plastic state. This minimizes the amount of material which is displaced and reoriented, and the rate of application and magnitude of the forces employed produce a reorientation of the material that is displaced in a direction which favors ductility and fatigue resistance. A forger generally tries to avoid "flow line run out," reorientation of plastic material in a direction normal to an exterior surface. In the process of the present invention the bond is formed while running, rather than after the workpieces are stopped, as happens in the prior art friction welding process. As a result, the material which is heated to a plastic state is swirled circumferentially rather than being displaced entirely radially as in the prior art. And the transition between the displaced and non-displaced material is abrupt as a result of the steep temperature gradients in the heated area. The fact that the direction of material reorientation does not intersect the exterior surface at an angle normal to the surface, but intsead, runs generally parallel or tangent to the exterior surface at the meeting point with the surface contributes to increased strength and resistance to fatigue failure in the bonded article. Finally, the large unheated masses closely adjacent the interface area achieved by concentrating the heat at the interface by the bonding operation serve to effect a rapid chill of the heat affected zone after the bond is formed. The heating time is so short, the plastic working is so severe, and the cooling is so fast that the grain is not only prevented from coarsening but is also highly refined throughout the heat affected zone. The plastic working in combination with the quickness with which the heat is applied and then extracted is also very important in the austenite-martensite transformation of steel since quick heating, plastic working and quick cooling will produce an extremely fine grained, and in effect, a super hardened structure which has unusual hardness, toughness and resistance to corrosion. The refinement of grain size effected by the forces applied combines with the fine grained structure resulting from rapid heating and rapid cooling to produce grain at the interface which is almost indistinguishable by normal metallographic means of grain size measurement.

Figure 21:
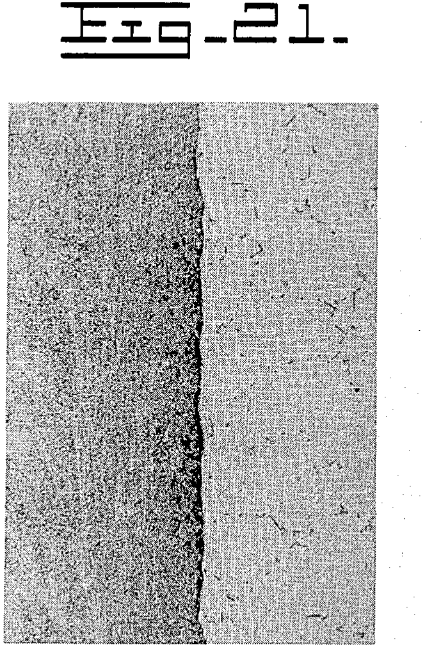
FIGS. 21 and 22 are photomicrographs, enlarged one hundred and five hundred times, respectively, of an etched cross-section of an SAE 8630 (dark)—GMR 235 (light) nickel alloy product bonded in accordance with the present invention and illustrate the absence of fused material at the solid-state boundary formed at the interface.
Figure 22:
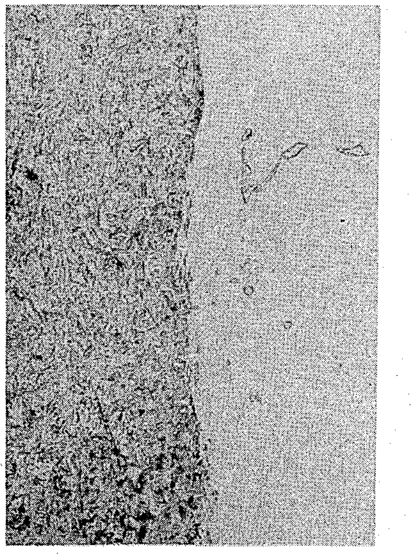

FIGS. 21 and 22 illustrate the solid-state bond and absence of alloying or fusion between parts bonded in accordance with the present invention. FIG. 21 is a photomicrograph, enlarged one hundred times, of the interface between an SAE 8630 steel part (darkly etched material) and a GMR 235 nickel alloy part (light unetched material) bonded in accordance with the present invention. FIG. 22 is a photomicrograph of the same parts but enlarged five hundred times. In FIG. 21 some circumferential reorientation of the SAE 8630 material is evident. The effects of this reorientation will be discussed further in connection with FIGS. 13A and 13B. In FIG. 22 it can be seen that there is some mechanical mixing of materials at the interface due to mechanical working during the bonding operation. This amount of working greatly depends on the torque level during the latter part of the cycle. The torque can be increased by lower initial speeds in conjunction with larger flywheels. The torque can be reduced by disconnecting the flywheel from the workpiece by the use of shear tabs as described in greater detail below with reference to FIGS. 34–39 and 28C.

Figure 23:
FIG. 23 is a photomicrograph, enlarged one hundred times, showing the clean bond obtained in highly reactive materials (here titanium) bonded in accordance with the present invention.

FIG. 23 is a photomicrograph, enlarged one hundred times, taken through the entire heat affected zone of two titanium parts bonded in accordance with the present invention. This photomicrograph illustrates the exceptionally clean bond obtained in highly reactive materials.

Figure 24:
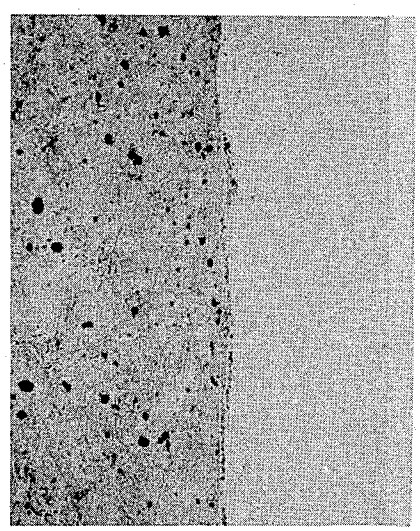
FIG. 24 is a photomicrograph, enlarged five hundred times, of an aluminum-bronze alloy and steel product bonded in accordance with the present invention.
Figure 25A:
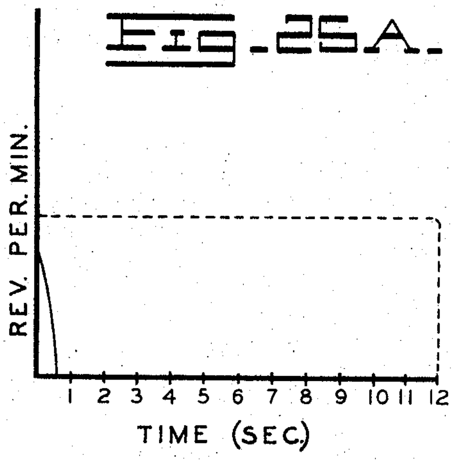
FIGS. 25A through 25E are plots comparing various parameters against time for the prior art friction technique (broken lines) and the present invention (solid lines)
Figure 25B:
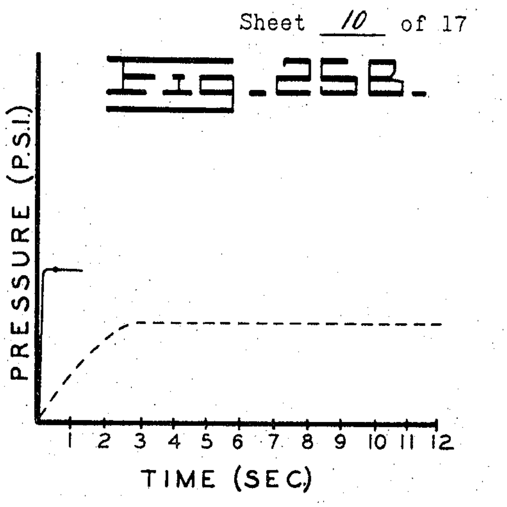
Figure 25C:
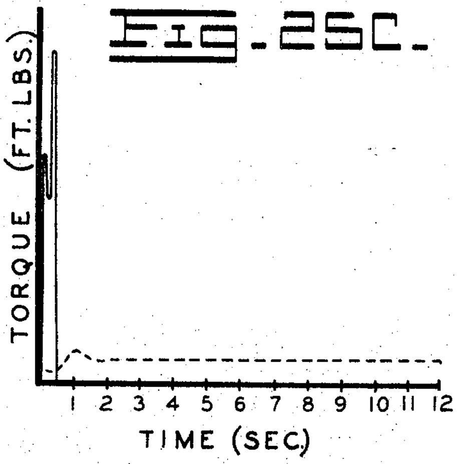
Figure 25D:
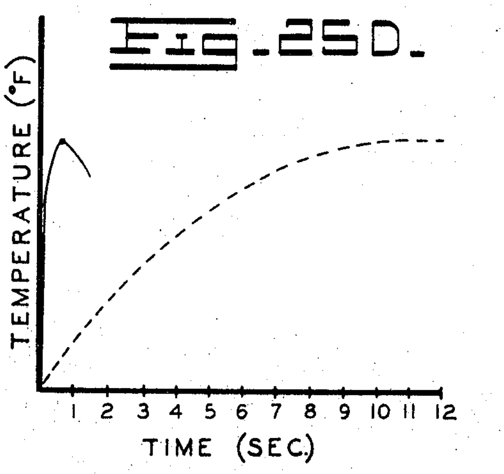
Figure 25E:
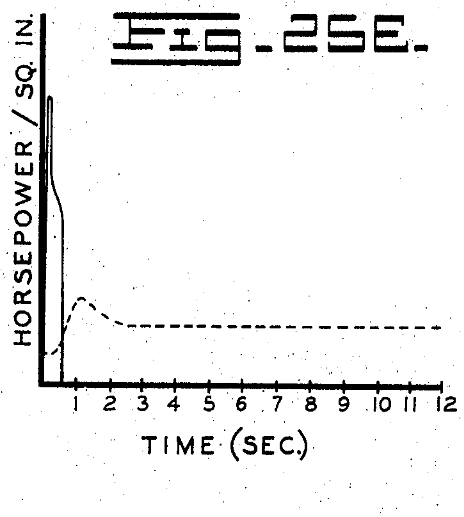

FIG. 24 is a photomicrograph, enlarged five hundred times, showing the interface between an aluminum bronze (light part) bonded to an SAE 1045 steel part (dark part) in accordance with the present invention. This photomicrograph also illustrates the absence of fused material and the solid-state bond achieved between dissimilar materials in products produced by the present invention.

Other features of the present invention can be best understood by comparison with the prior art friction welding process. Two of the most readily apparent and also most significant differences between the present invention and the prior art friction welding process reside in the amount of heat energy used and the rate at which the heat is supplied.

Figure 26:
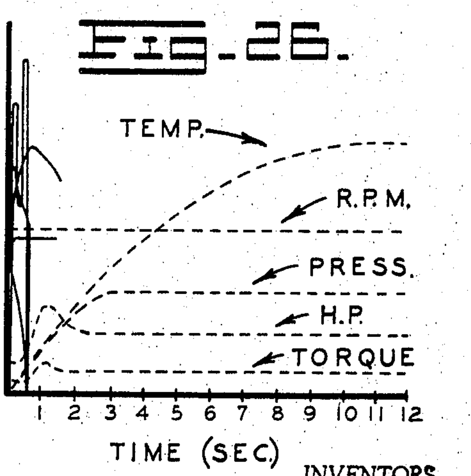
FIG. 26 is a plot, on one chart, of the various parameters plotted individually in FIGS. 25A through 25E.
Figure 27:
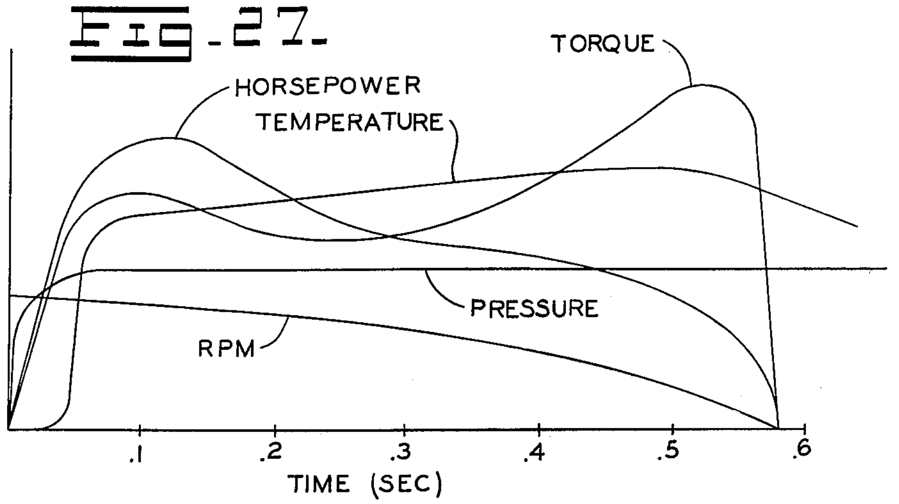
FIG. 27 is a plot, on an expanded time scale, of various parameters versus time for the process of the present invention.

In FIG. 27 various parameters, indicated by the legends applied, are plotted against time for two SAE 1045 steel one-inch diameter bars bonded in accordance with the present invention under the conditions listed in line 3 of the graph shown in FIG. 4. For comparison with the prior art friction welding process these same parameters have been individually plotted with the corresponding parameters for a representative prior art friction welding process, but on a compressed time scale to permit the entire friction welding process to be included on the plot, in FIGS. 25A through 25E. FIG. 26 is a combined plot of all parameters for both the method of the present invention and the prior art friction process. These plots illustrate quite markedly the distant and basic differences between the two methods. The method of the present invention uses less than one-tenth of the energy of the prior art friction welding process and heats less than one-tenth of the volume of materials heated by the prior art friction welding process.

Figure 29:
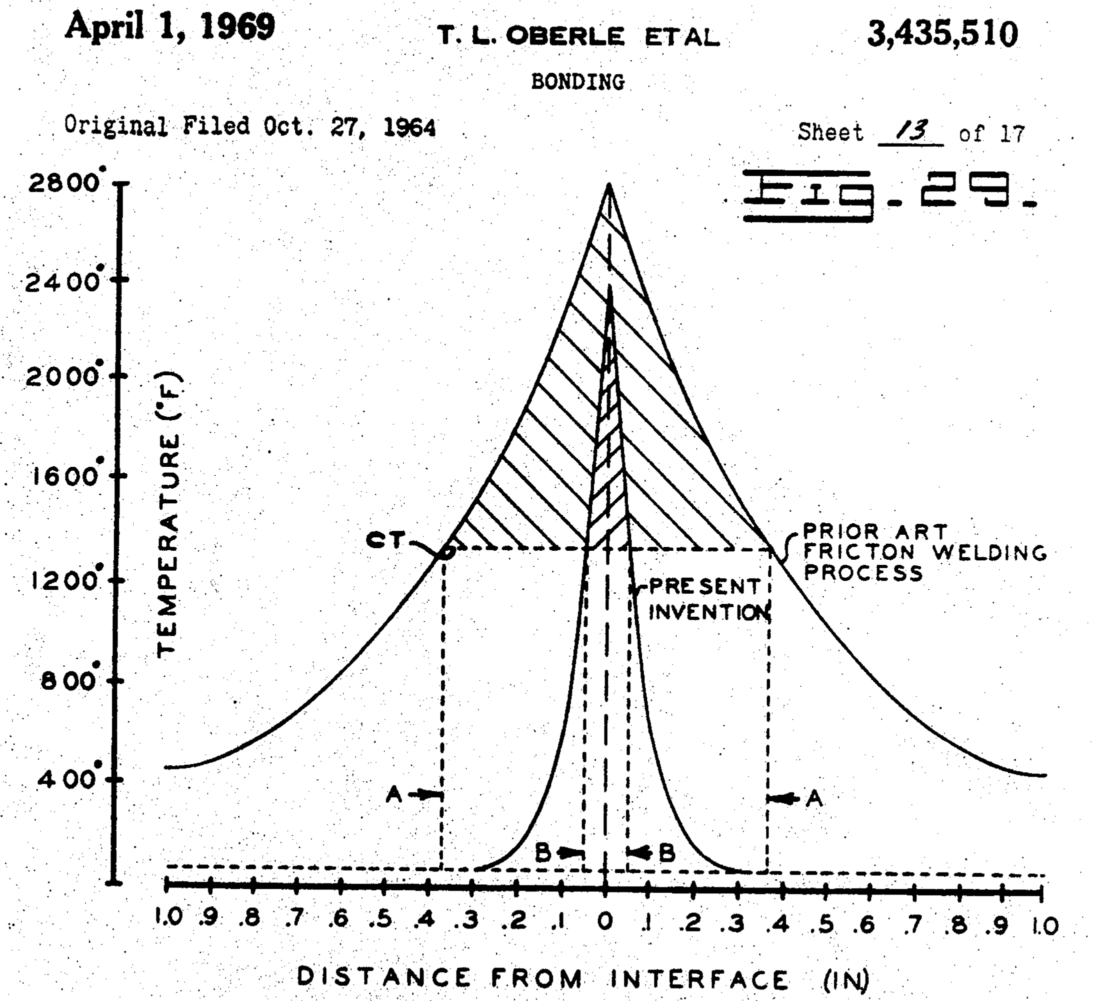
FIG. 29 is a comparison plot of temperature versus distance along the longitudinal axis of a product bonded by the prior art friction process and a product bonded by the present invention.

FIG. 29 is a theoretical plot of temperature versus distance from the interface for the identical materials bonded by the prior art friction welding process and the present invention. The dashed line indicated by the legend CT corresponds to the lower critical temperature at which recrystallization and grain growth become significant in steels. The dashed lines between the arrows A—A indicate the limits of the heat affected zone for the prior art friction welding process, and the dashed lines indicated by the arrows B—B indicate the limits of the heat affected zone for the present invention.

The upper temperature for the prior art friction welding process is approximate and will vary depending on the way the process is practiced. The temperature shown in FIG. 29 is that which would exist in instances in which a detectable fluid layer was formed during the welding operations. Due to the relatively gentle slope of the heat gradient curve, it will be seen that the plotting of a lower maximum temperature would not significantly affect the width of the heat affected zone.

Although the plot of the temperatures in FIG. 29 is theoretical, the distribution of the temperatures shown corresponds quite closely to that which occurs in actual practice as will be more apparent by having a reference to FIGS. 5A through 20.

Figure 5A:
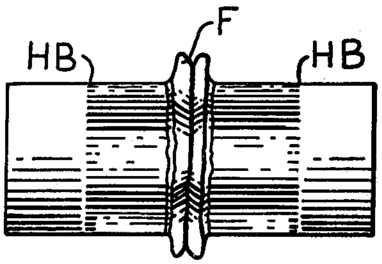
FIGS. 5A and 5B are exterior views of products bonded by the prior art friction process and the present invention, respectively.
Figure 6A:
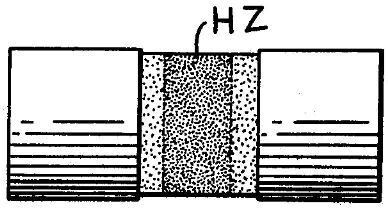
FIGS. 6A and 6B are exterior views of the products shown in FIGS. 5A and 5B, respectively, but with the flash removed and etching applied to show the relative width of the heat affected zones.
Figure 5B:
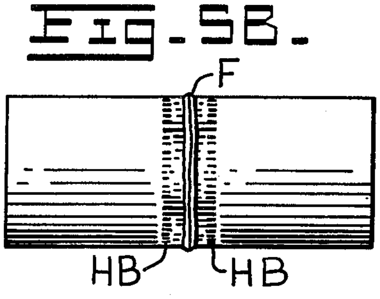
Figure 6B:
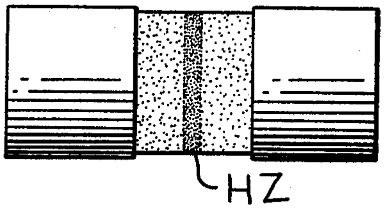
Figure 7A:
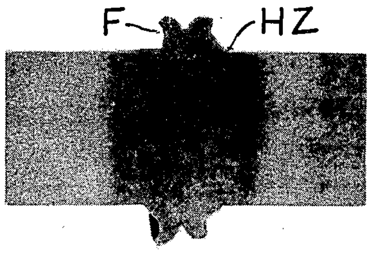
FIGS. 7A and 7B are views of etched cross-sections of the products shown in FIGS. 5A and 5B, respectively, and show the heat affected zones.
Figure 7B:
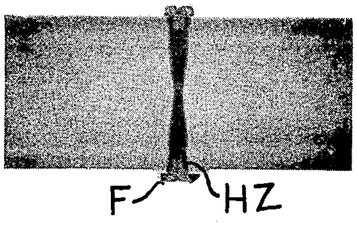

FIGS. 5A and 5B are exterior views of three-quarter inch diameter SAE 1045 steel bars bonded by the prior art friction technique and the present invention, respectively. The flash F produced by the prior art friction welding process is about twenty times that produced by the method of the present invention. Heat bands HB give a rough indication of the extent of the heat affected zone in each case. In FIGS. 6A and 6B the flash has been removed from the specimens illustrated in FIGS. 5A and 5B, respectively, and etching has been applied to show the extent of the heat affected zone HZ in each instance. FIGS. 7A and 7B are views of cross-sections of the specimens shown in FIGS. 5A and 5B, respectively, with etching applied to show the relative widths of the heat affected zones HZ along a diameter of the interface.

Figure 8A:
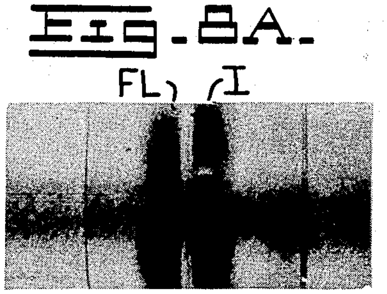
FIGS. 8A and 8B are exterior views of the products shown in FIGS. 5A and 5B, respectively, but with the flash removed and the surfaces deep etched to show the reorientation of material heated to a plastic state during the bonding operation.
Figure 8B:
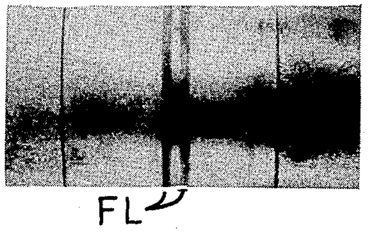

FIGS. 8A and 8B are views of the specimens shown in FIGS. 5A and 5B, respectively, but with the flash ground off and deep etching applied to show the reorientation of material heated to a plastic state during the bonding operation. In this case the specimens contain manganese sulfide stringers normally disposed parallel to the longitudinal axis of the bars along the direction in which the bars were rolled. The hot acid etch attacks the stringers at a more rapid rate than the balance of the steel and thereby develops an etch pattern which indicates the flow line direction. The severe pitting of the friction welded specimen illustrated in FIG. 8A results from the flow lines FL being reoriented in a radial manner by the excessive flashing resulting from the excess heat applied during the friction welding process. Also, the etched out furrow at the interface I is an indication that in spite of the larger flash produced in the conventional prior art friction welding process, the weld does contain imperfections radially inwardly of the flash. The surface of the specimen produced by the present invention illustrated in FIG. 8B was attacked very lightly in comparison to that produced by the prior art friction welding process. Moreover, what reorientation did occur occurred in a direction which was primarily circumferential so that the flow lines FL are swirled circumferentially to extend substantially tangent to the exterior surface rather than to intersect the surface in a direction normal to the surface. This has important consequences in respect to the ductility and thus the bend strength and fatigue resistance of the bonded article as will be discussed further below.

Figure 13A:
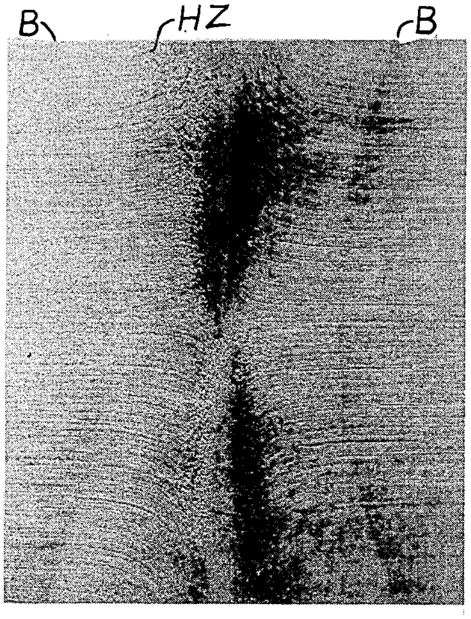
FIGS. 13A and 13B are views, enlarged six times, of deep etched cross-sections of products bonded by the prior art friction process and the present invention, respectively, and illustrate the heat affected zone and the reorientation of material heated to a plastic state.
Figure 13B:
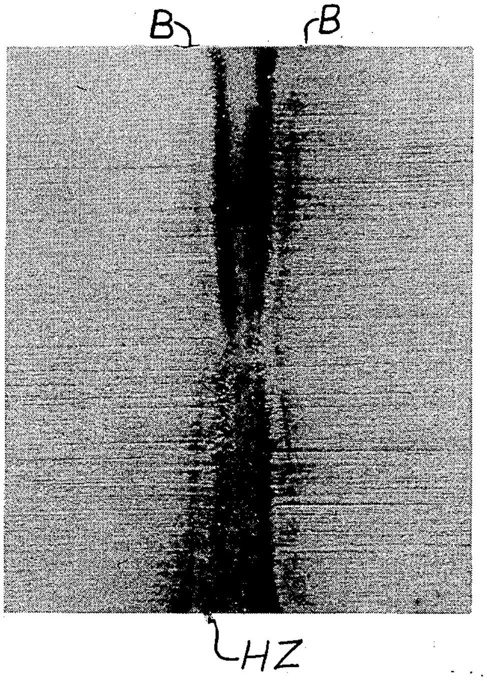

FIGS. 13A and 13B are views of cross-sections of the products shown in FIGS. 5A and 5B, respectively, but enlarged six times. The cross-sections have again been deep etched to show the flow line and thus the material reorientation. In the case of the product produced by the prior art friction welding process the axially extending flow lines begin to turn to a radial direction at or near the boundary B of the heat affected zone HZ (the more lightly shaded area in the central part of the figure). In the case of the product illustrated in the FIG. 13B produced by the method of the present invention the circumferential reorientation of the flow lines is confined to a very localized area disposed well inside the outer boundaries B of the heat affected zone HZ, which is itself quite narrow in extent.

Figure 14:
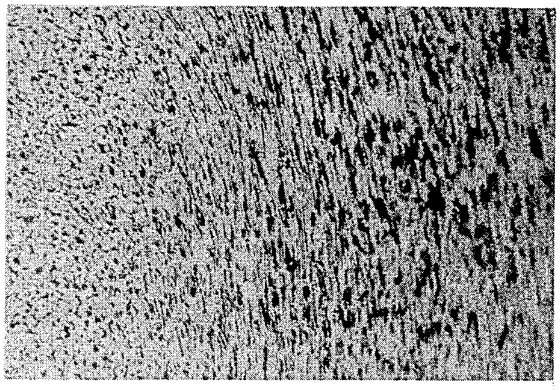
FIG. 14 is a photomicrograph, enlarged seventy-five times and taken on a plane inclined 10° from the plane of the interface, of a deep etched cross-section of a product bonded in accordance with the present invention, and illustrates the sharp change in the direction of flow lines.

Further evidence of the abrupt transition between the displaced and non-displaced material in products produced by the present invention is presented by FIG. 14. This is a view of a cross-section of a product bonded in accordance with the present invention taken on a plane which is oriented ten degrees from the plane of the interface. The photograph is enlarged seventy-five times so that one inch on the photograph represents only 0.0023 inch in the axial direction, yet the flow line direction changes from what is virtually the axial direction to the circumferential direction within that one inch.

Figures 15A, 15B, 15C, 15D:
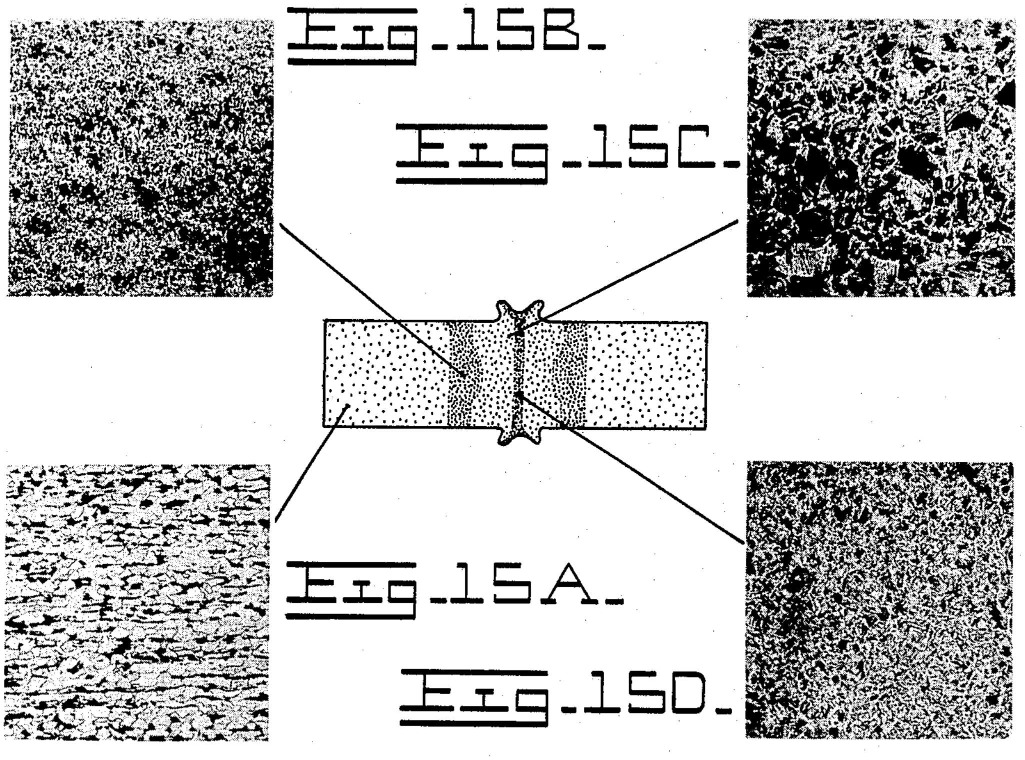
FIG. 15A is a photomicrograph, enlarged seventy-five times, of an etched cross-section of a product bonded by the prior art friction process and illustrates the parent grain structure in the non-heat affected zone.
FIG. 15B is a photomicrograph like FIG. 15A but taken in the heat affected zone near the outer boundary of the heat affected zone.
FIG. 15C is a photomicrograph like FIG. 15A but taken from a part of the heat affected zone where grain growth has occurred.
FIG. 15D is a photomicrograph like FIG. 15A but taken at the interface.
Figure 16:
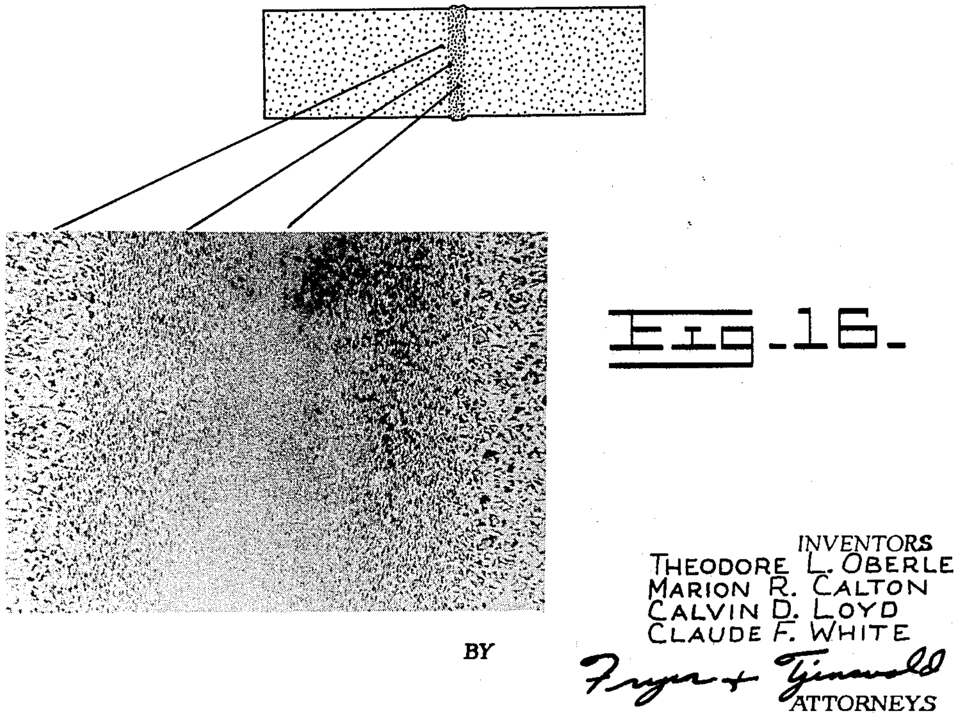
FIG. 16 is a photomicrograph, enlarged seventy-five times, of an etched cross-section of a product bonded in accordance with the present invention and shows the entire width of the heat affected zone.

The effects of the heat and forces applied on the grain structure in products produced by the prior art friction welding technique and the method of the present invention are shown in the photomicrographs of FIGS. 15A–15D and FIG. 16, respectively. These figures show the grain structure of the products in the as-bonded state without any subsequent heat treatment. Each of the photomicrographs is enlarged seventy-five times, and the materials (low alloy steel) and the etchant applied are identical. FIG. 16 shows the entire heat affected zone with a product produced in accordance with the present invention, but it was necessary to resort to sample photomicrographs for the product produced by the prior art friction welding technique since a continuous showing of even one-half of the heat affected zone in this product would require a dimension several times the vertical length of the drawing sheet.

As shown in FIG. 16, in products of the present invention there is an abrupt transition from grain not affected by the heat applied to grain which has been refined by the heat and forces applied just inside the boundary of the heat affected zone. The grain at the interface is extremely refined to the point where it is indistinguishable at the seventy-five times mangnification used in the photomicrograph and almost indistinguishable by any other conventional method of determining grain size. It is evident that there is no grain coarsening at any point within the heat affected zone.

FIG. 15A shows the grain size in the non-heat affected zone in a parent part of a product produced by the prior art friction welding process. FIG. 15 B is taken just inside the boundary of the heat affected zone and shows some grain refinement produced by recrystallization from just above the upper critical temperature. FIG. 15 shows the pronounced grain growth which occurs in a substantial part of the heat affected zone of products produced by the prior art friction welding process. FIG. 15D shows some grain refinement at the interface in this particular product.

Figure 17:
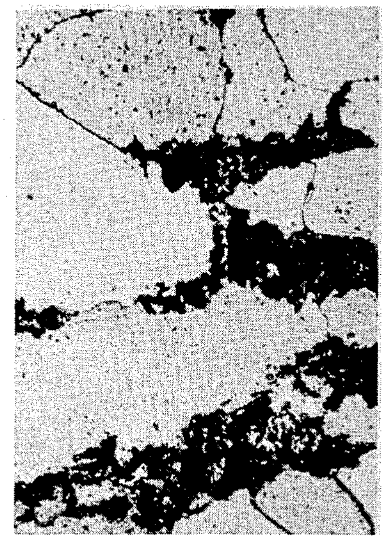
FIG. 17 is a photomicrograph, enlarged fifteen hundred times, of an etched cross-section of a product bonded by the prior art friction technique and is taken near the boundary of the heat affected zone.
Figure 18:
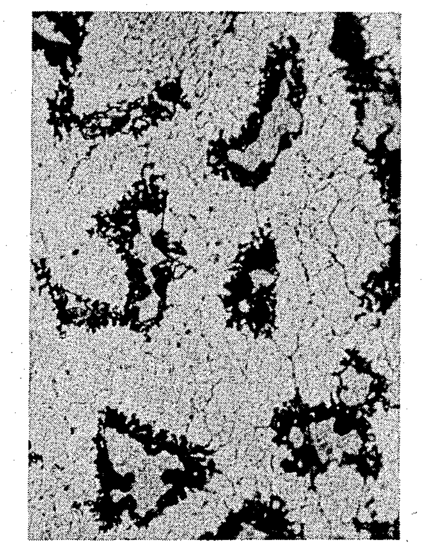
FIG. 18 is a photomicrograph, enlarged fifteen hundred times, of an etched cross-section of a product bonded in accordance with the present invention and is taken near the boundary of the heat affected zone.

FIGS. 17 and 18 are photomicrographs, enlarged fifteen hundred times, of cross-sections of products produced by the prior art friction welding process and the present invention, respectively, showing the comparison between the grain structure just inside the boundary of the heat affected zone in each product. FIG. 17 shows the unrefined grain existing in the area intermediate FIGS. 15A and 15B which was heated between the $AC_1$ and $AC_3$ temperatures. Although the pearlite (dark areas) was taken into solution by this heating the ferrite (light areas) remains unaffected from heat and due to the distance from the interface is not affected by working of the metal. The pearlite which was taken into solution was transformed to intermediate transformation products and pearlite due to the relatively slow cooling of the part. As shown in FIG. 18 the grain structure in the area just inside of the heat affected zone of a product of the present invention is quite complex for the low alloy steel material of which the product is composed. Here the material was heated between the $AC_1$ and $AC_3$ temperatures. This heating transformed the pearlite but did not transform the ferrite (light areas). The pearlite colonies were partially homogenized and transformed to martensite and intermediate transformation products. The ferrite was refined to a grain size of ASTM 12 and finer because of having been just above the recrystallization temperature for a very short time.

Figure 19:
FIG. 19 is a photomicrograph, enlarged fifteen hundred times, of an etched cross-section of a product bonded by the prior art friction welding process and is taken near the interface.
Figure 20:
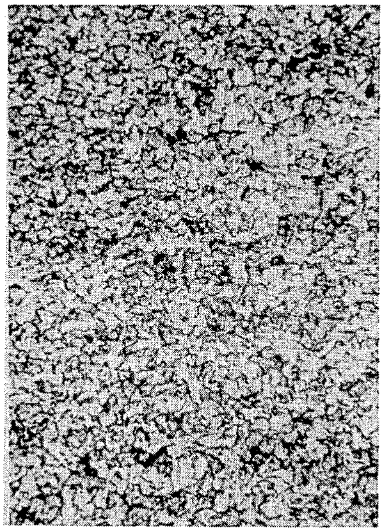
FIG. 20 is a cross-section view, enlarged fifteen hundred times, of an etched cross-section of a product bonded in accordance with the present invention and is taken near the interface.

FIGS. 19 and 20 are comparison views, also at fifteen hundred magnification, of areas adjacent to the interface of a product produced by the prior art friction welding process and the present invention, respectively. In the case of the product produced by the prior art friction welding process the grain size has become so enlarged that only a portion of a single grain can be shown in the area of the photograph. This grain growth results from heating the part well above the $AC_3$ temperature for an excessive length of time. The microconstituents of this area comprise acicular ferrite and intermediate transformation products. The constituents of the area of the product produced by the present invention shown in FIG. 20 cannot be readily identified by metallographic means because of the extreme fineness of the microstructure. Time-temperature-transformation curves, however, would indicate that ferrite, intermediate transformation products and martensite are present. The above comments regarding specific constituents apply to products composed of low carbon steels like the products illustrated. Microstructures or other materials will of course change with the composition of the material.

Figure 9:
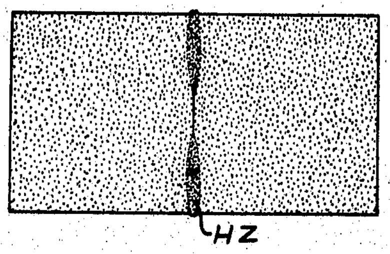
FIGS. 9 and 10 are views of etched cross-sections of products produced by the present invention and illustrate the progression of the bond across the interface.
Figure 10:
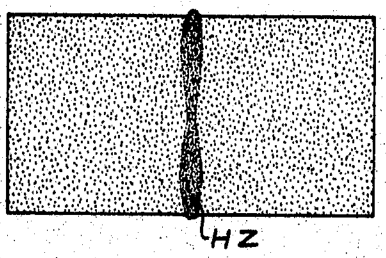
Figure 11A:
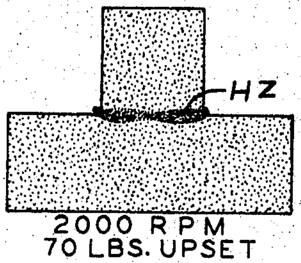
FIGS. 11A through 11D are views of etched cross-sections of products formed by this invention and illustrate the results of variations in the speed of rotation and pressure applied to effect the bond.
Figure 11B:
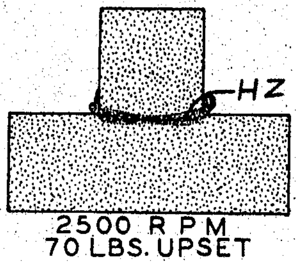
Figure 11C:
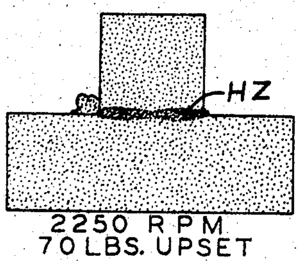
Figure 11D:
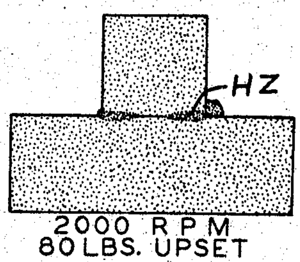
Figure 12:
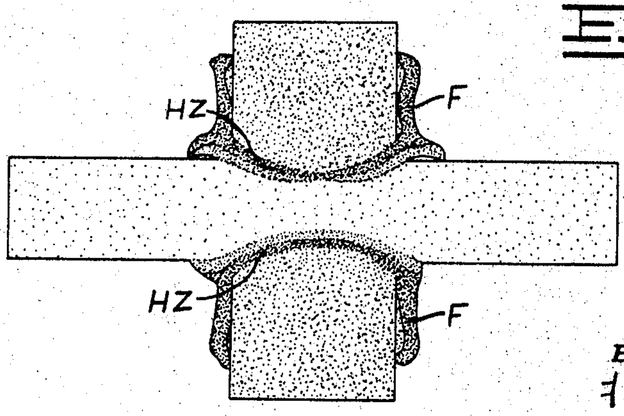
FIG. 12 is a view of an etched cross-section of a product produced in accordance with the present invention and illustrates the results of applying energy significantly in excess of that required to form the bond.

The characteristics of the bond of the present invention are not dependent entirely upon the amount of energy applied but are dependent also upon the manner in which the energy is applied. Thus, the bond of the present invention can be achieved across a part of the interface with an amount of energy somewhat less than that which would normally be desired to insure a complete bond across the entire interface. The bond can also be obtained even though an amount of energy substantially in excess of that required to form an optimum bond is applied to the parts to be joined. FIGS. 9 through 12 illustrate this. Each of these figures are views of cross-sections of products produced in accordance with the present invention with etchant applied to show the extent of the heat affected zone HZ. FIG. 9 illustrates the effects of applying less energy than is required to form a bond across the entire interface. It can be seen from this figure that the bond progresses toward the center around the interface. FIG. 10 illustrates the bond produced when a sufficient amount of energy is applied at a rate of pressure build-up sufficiently fast to heat the entire interface and form a complete bond under proper conditions of pressure and heat generation. FIGS. 11A through 11D each show three-quarter inch SAE 1040 steel rods bonded to three-quarter inch SAE 1040 steel plate under the speeds and pressures indicated beneath each figure. In FIG. 12 the bond between the plate and the upper bar was made with about two and one-half times the normal amount of energy while the bond between the plate and the lower bar was made with about four times the normal amount of energy. In this case the rate of pressure build-up and the total pressure applied were effective to displace material heated to a plastic condition before any molten material contributing to fusion could be produced, and the characteristics of the bond of the present invention, including the narrow width of the heat affected zone, remain unchanged. The primary effect of the excess energy was to produce more flash F. It is thus apparent that the method of the present invention permits a fair amount of latitude insofar as the amount of energy is concerned, provided a sufficiently large amount of heat is applied sufficiently quick and under the proper conditions of force and plastic working to achieve the boundary transition and the unique microstructure in the heat affected zone producing the improved bond of the present invention.

Comparative data developed from bend tests and fatigue tests of products produced by the present invention and the prior art friction welding technique confirm the superiority of the products of the present invention. In bend tests, within the limits of accuracy of experimental error of the tests, products produced by the present invention exhibit a joint efficiency of one hundred percent while products produced by the prior art friction welding process fractured at joint efficiencies ranging from forty-six percent to eighty-five percent. In fatigue tests the data indicate that products produced by the present invention are thirty-three percent stronger in fatigue than products produced by the prior art friction welding process.

The product of the present invention is a fabricated article comprising two or more parts joined across a common boundary area having unique structure and highly desirable mechanical properties. This common area, corresponding to the heat affected zones produced during the bonding operation includes an interface having a solid-state bond (in which atoms of the different parts are believed to be engaged in lattice registry) without detectable fused material. The grain in the entire portion of the heat affected zone heated to a condition at which grain growth can occur is refined as a result of the manner in which the heat and bonding forces are applied and the rate at which the heat is extracted after the bond is formed. Very little displacement of material is produced by the bonding operation and what displacement or reorientation does exist in the bonded product contributes superior strength and fatigue properties to the product as compared to products produced by prior art processes.

The present invention thus affords fastening means for securing together two or more parts with a solid-state bond formed in a narrow zone of work fragmented grain, which zone terminates in an abrupt transition to the parent grain of the parts existing prior to the bonding operation and, in the case of low carbon steels, includes an inner zone of reoriented material also having boundaries of abrupt transition.

The product of the present invention can take many forms, and FIGS. 30 through 39 and 42 illustrate some specific examples of such forms.

Figure 30:
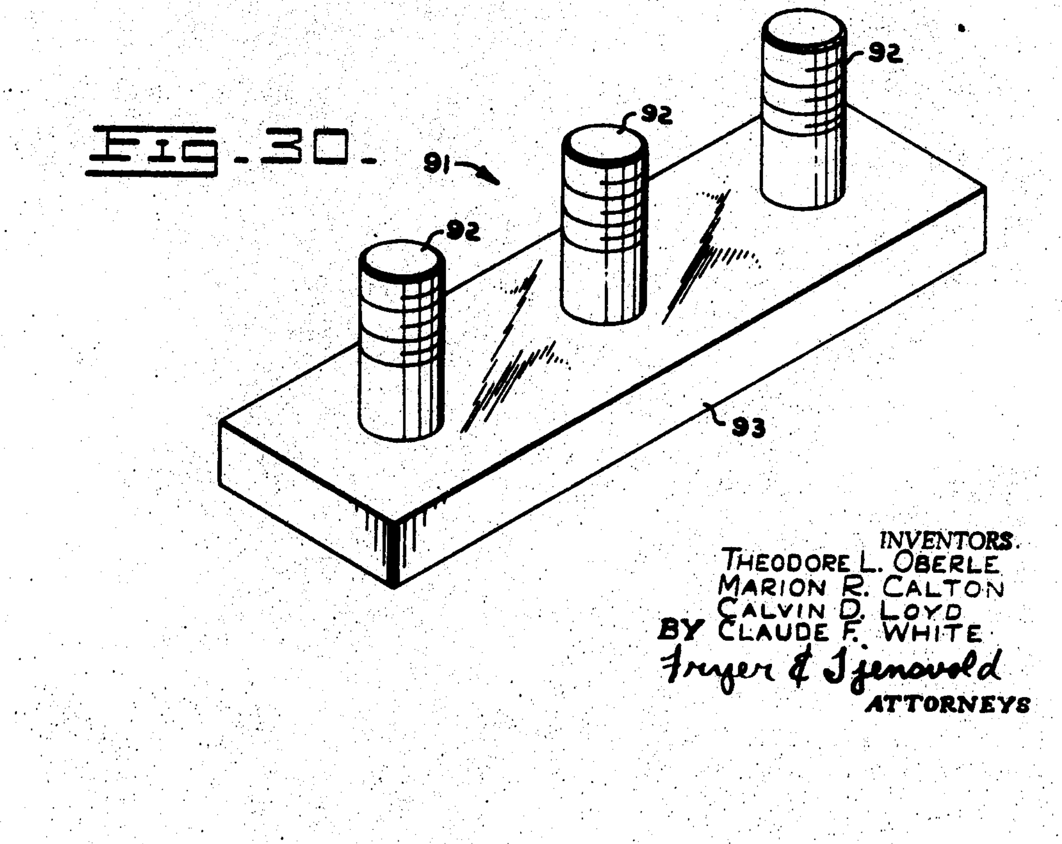
FIG. 30 is an isometric view of a product formed by bonding studs to a heavy plate in accordance with the present invention.

In FIG. 30 the article indicated generally by reference numeral 91 comprises a series of studs 92 bonded to a heavy steel plate 93. The present invention makes an article of this sort practical since a strong bond can be formed between the studs and the plate regardless of the thickness of the plate. In the past bolts were mounted to a plate, and it was necessary to cut square holes in the plate to accommodate the square corners of bolt heads. Square holes act as stress raisers and present problems in heat treatment. It was difficult to obtain a satisfactory bond between bars or studs like 92 and a heavy steel plate with the prior art friction welding process because the heavy plate cooled the interface area so rapidly that a proper concentration of heat could not be obtained at the interface. As noted above, articles like 91 can be readily produced by a portable machine constructed in accordance with the present invention to perform the bonding operation on the job site.

Figure 31:
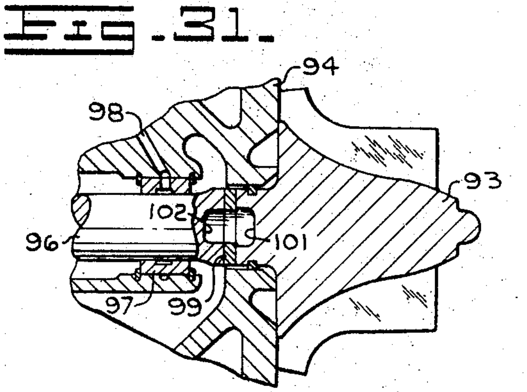
FIG. 31 is a fragmentary view in section of a high temperature alloy turbine wheel bonded to a heat insulating washer which is in turn bonded to a low alloy shaft in accordance with the present invention.
Figure 32:
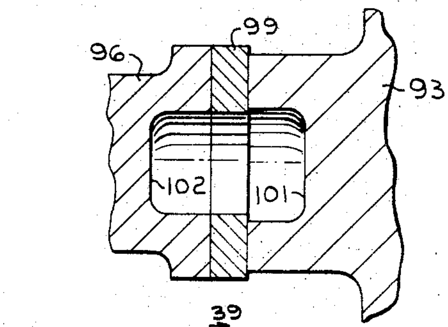
FIG. 32 is an enlarged fragmentary view in section of the union between the turbine wheel, washer and shaft of FIG. 31 before the shaft and washer are turned down to the final outside diameter.
Figure 33:
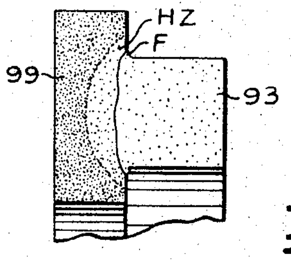
FIG. 33 is an enlarged fragmentary view of an etched cross-section of the low strength heat insulating washer bonded to the high strength turbine wheel of FIG. 31.

By the present invention products can be fabricated to have specific physical characteristics at particular locations desired, and a good example of a product so fabricated is shown in FIGS. 31 through 33. In FIG. 31 an exhaust gas turbine wheel 93 is shown as it is mounted for rotation within a casing 94. The drive shaft 96 leading from the turbine wheel 93 is mounted for rotation within a bearing 97. The bearing is adapted to be oil cooled by oil conducted through a passage 98 formed in the casing 94. The turbine wheel 93 is heated to high temperatures by the exhaust gases rotating the wheel and must therefore be formed from a high temperature alloy. To reduce costs it is desirable to form the shaft 96 from low cost plain carbon steel. In the past, problems arose in forming a bond between the shaft and the turbine wheel because of the dissimilarity in the materials of which each element was composed, and also because of the high temperatures to which the union was subjected. The rotor shaft assemblies had been manufactured by silver brazing a tapered end of a shaft into a complementarily tapered socket in the rear face of the turbine wheel. This method was very undesirable however from the cost standpoint and the silver brazed connection very frequently failed during operation, resulting in destruction of the rotor and the housing. The method of the present invention permits a high strength bond to be formed directly between the wheel and the shaft and at low cost, thus overcoming the primary problem of failure presented by the prior art bonding technique.

There is also a danger of overheating the bearing 97, and the method of the present invention enables a specifically fabricated product to be obtained which effectively eliminates this danger. Thus, a titanium allow washer 99 having a low thermal conductivity can be readily bonded to both the super alloy turbine wheel and the plain carbon steel shaft 96 even though the large differences in the atomic diameters would have made such a bond difficult or impossible to achieve by prior art bonding techniques. Since the heat flow through the titanium washer is low, the temperature drop between the turbine wheel 93 and the adjacent end of the shaft 96 can be controlled by varying the thickness of the washer. For example, a 350° F. additional drop in temperature can be achieved for each additional ⅛ inch thickness of the washer in the application illustrated in FIG. 31. To further reduce the transfer of heat between the turbine wheel 93 and the shaft 96 and the adjacent ends of the wheel and shaft can be formed with recesses 101 and 102 as illustrated to provide a heat dam.

The high alloy turbine wheel 93 is a much higher strength material than the titanium alloy washer 99, and to prevent excess flashing, it is preferable to form the washer with slightly larger inside and outside diameters to thereby spread the forces applied in a bonding operation through a greater area of the washer. After the bonding operation is complete the parts can be turned down from the sizes illustrated in FIG. 32 to the final dimensions illustrated in FIG. 31. FIG. 33 shows an etched and enlarged cross-section illustrating the extent of the heat affected zone HZ and the flash F produced between the washer 99 and the turbine wheel 93.

The quickness of the process of the present invention produces desirable results in a variety of products. SAE 52100 steel balls can be welded to steel shafts without softening the balls in the process and without destroying the spherical accuracy of the balls. TD nickel parts can be welded without destroying the thoria dispersion. The process does not reduce the effectiveness of boron as a hardenability agent.

Figure 34:
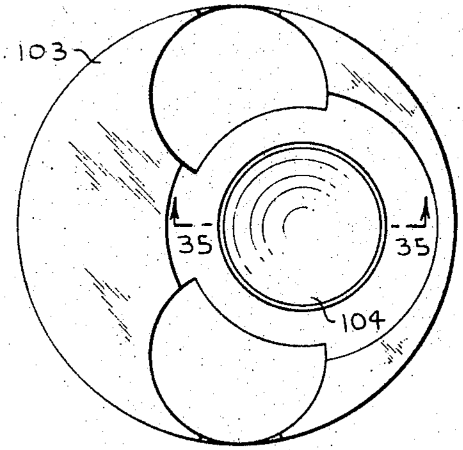
FIG. 34 is a plan view of an aluminum piston having a steel heat plug bonded to the piston.
Figure 39:
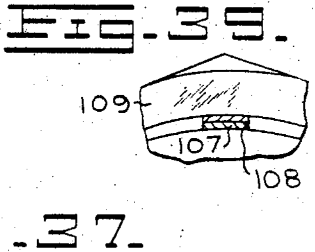
FIG. 39 is a fragmentary view taken along the line indicated by and in the direction of the arrows 39—39 in FIG. 36.

Another example of a product of the present invention fabricated to have specific characteristics at particular locations is shown in FIGS. 34 through 39. FIG. 34 shows the top of an aluminum alloy piston 103 having a stainless steel heat plug 104 bonded to a part of the piston surface which is subjected to temperatures significantly higher than the remaining surface of the piston. Prior to the present invention it was necessary to attach the steel heat plug to the piston by a bolt formed integral with the heat plug and to mount the bolt through a hole in the piston crown since a satisfactory bond between the stainless steel and the aluminum alloy could not be satisfactorily obtained by prior art bonding techniques. The manufacture of plugs having integral bolts was expensive and the crown of the piston was weakened by the hole required for installation of the heat plug.

Figure 38:
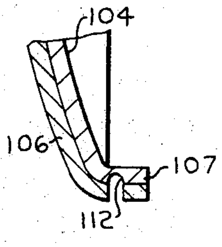
FIG. 38 is an enlarged fragmentary cross-section view of a portion of the heat plug and illustrates the manner in which tabs of the heat plug can be undercut to shear at a certain torque level during the bonding operation.
Figure 37:
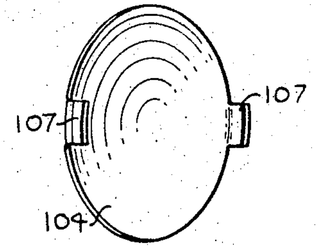
FIG. 37 is an isometric view of a heat plug prior to being bonded to the piston in FIG. 34.
Figure 35:
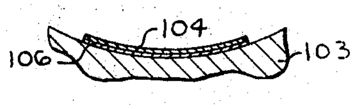
FIG. 35 is a fragmentary cross-section view taken along the line indicated by and in the direction of the arrows 35—35 of FIG. 34.

As illustrated in FIGS. 37 and 38 the plug 104 is made from commercial aluminum clad stainless steel in which an aluminum layer 106 is disposed on the steel surface to be bonded to the piston. The plug 104 is formed with upstanding tabs 107 which are inserted in mating slots 108 formed in the inside diameter of a nut 109, which in turn is threaded on a mandrel 111. To bond the plug 104 to the piston 103 the mandrel 111 is rotated while the piston 103 is held stationary. The tabs 107 may preferably be undercut with grooves 112 to afford means for automatically limiting the torque applied to the plug 104 in response to the friction developed at the interface between the plug and the piston. When so undercut the tabs 107 will shear at a torque value corresponding to a sufficient input of heat to form a bond between the plug and piston. Limiting the torque by shearing the tabs 107 eliminates substantially all the rotational low speed working of the bond zone. The benefits lost by eliminating such working will be pointed out below in the discussion of the bonds shown in FIGS. 28A and 28B. A Teflon cloth 113 is placed between the heat plug and the mandrel 111 to prevent the mandrel from welding to the heat plug after the tabs 107 are sheared off.

Figure 28A:
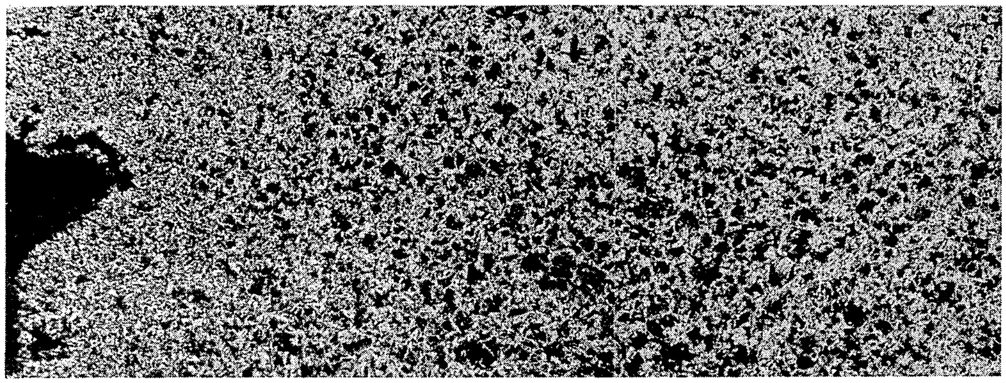
FIG. 28A is a photomicrograph, enlarged one hundred times, of the interface zone of a bond in SAE 1018 steel parts subjected to high torque and rotational plastic working after the bond formed.
Figure 28B:
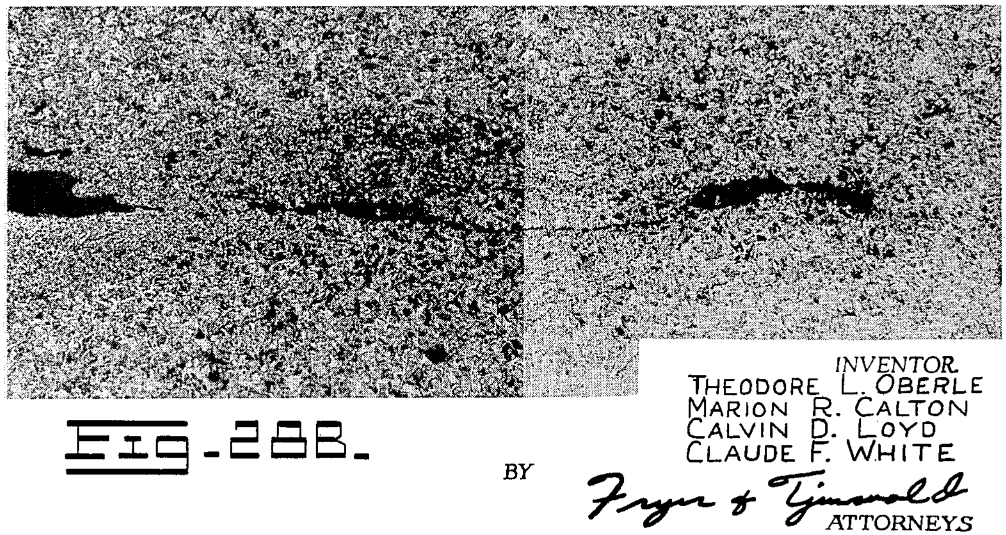
FIG. 28B is a photomicrograph, enlarged one hundred times, of the interface zone of a bond in SAE 1018 steel parts formed under the same conditions as the bond shown in FIG. 28A except for the elimination of substantially all torque and rotational plastic working after the bond formed.
Figure 28C:
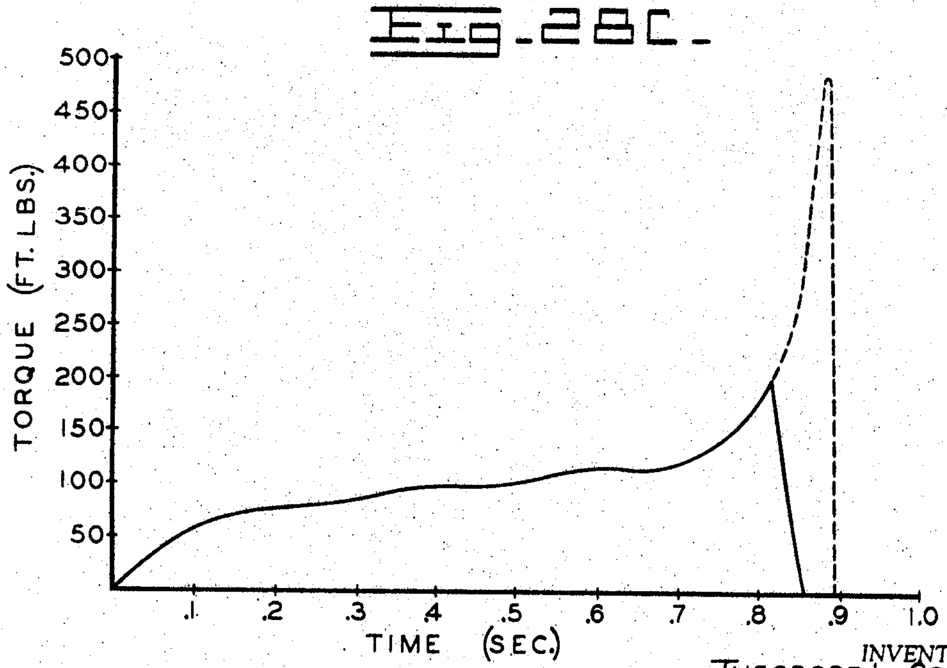
FIG. 28C is a torque-time plot illustrating, by the broken line portion of the plot, the effect of using a shear tab torque limiting technique of the present invention.
Figure 36:
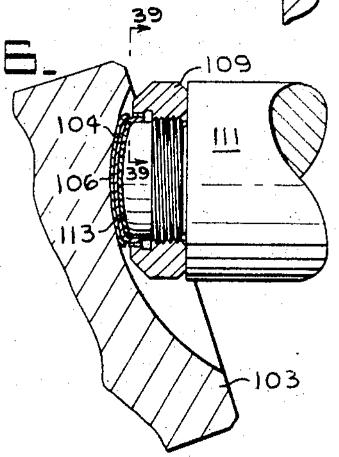
FIG. 36 is a fragmentary cross-section view illustrating the method and apparatus for bonding the heat plug to the piston shown in FIG. 34.

FIG. 28C illustrates the torque time plot for a shear tab torque limiting construction like that illustrated in FIGS. 36 through 38. In this figure the area under the dashed portion of the curve corresponds to the amount of heat which is prevented from entering the interface when the tabs 107 shear to disconnect the inertial mass from the plug 104. It is another advantage of the shear tab construction that proper positioning of the groove 112 can eliminate the necessity of subsequent machining.

Figure 40:
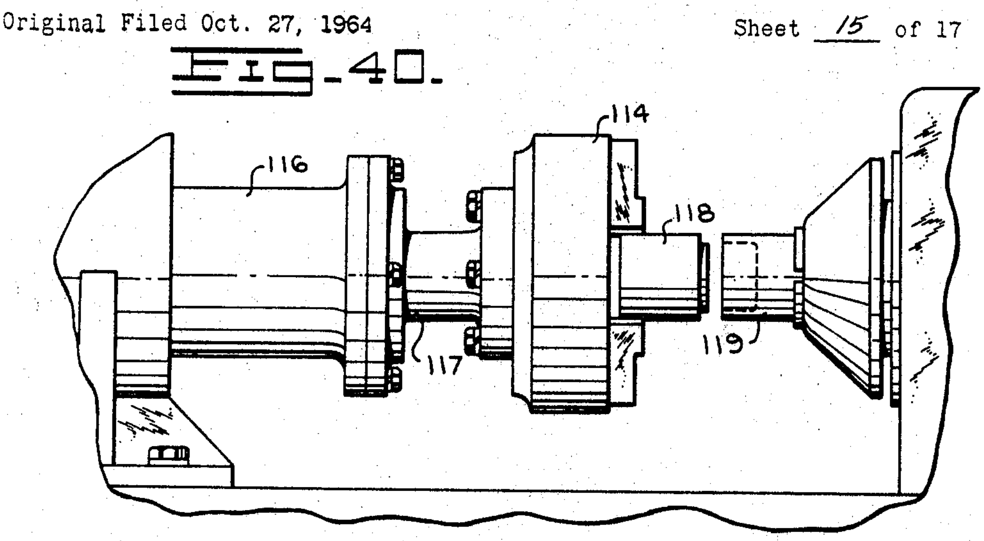
FIG. 40 is a fragmentary elevation view of a flexible follower which can be used in apparatus of the present invention to facilitate alignment of the parts to be bonded.

In some instances it may be desirable to permit some flexure in the mounting of one of the parts to be bonded to assist intimate contact at the bond interface. FIG. 40 illustrates one embodiment of a machine in which a chuck 114 is mounted on a support member 116 having a reduced diameter portion 117. Upon high pressure contact of workpieces 118 and 119, the reduced diameter portion 117 permits some self aligning to occur between the workpieces 118 and 119 to permit complete and intimate contact across the interface.

Figure 41:
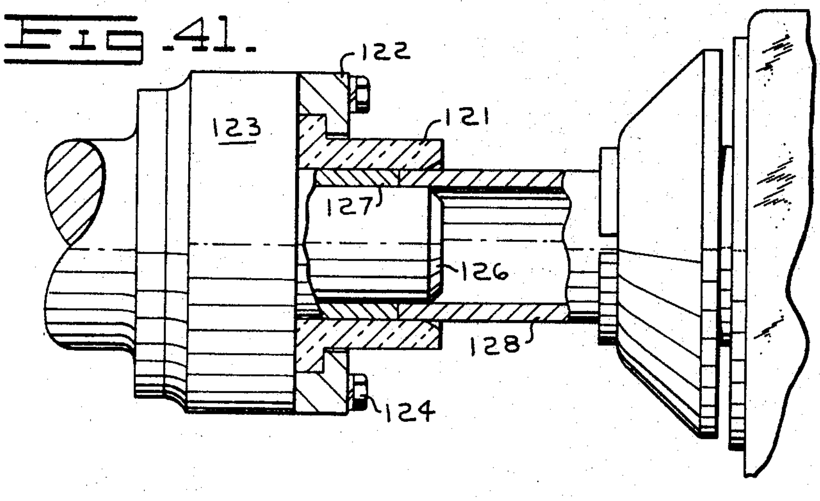
FIG. 41 is a fragmentary elevation view, partly broken away in section, illustrating the use of a ceramic collar and a ceramic insert plug for smoothing flash formed during the bonding operation.

The amount of flash produced in products of the present invention is small, and it is therefore feasible in many instances to smooth the flash at the time that it is formed to avoid the necessity for subsequent machining. In FIG. 41 one form of apparatus is illustrated for accomplishing this result. A ceramic sleeve 121 is clamped in place by a collar 122 which is in turn mounted on a chuck 123 by capscrews 124. A ceramic plug 126 is also retained in the position illustrated to smooth the inner flash formed when the workpieces 127 and 128 are bonded together. In actual practice the use of ceramic plugs and sleeves in this manner virtually eliminates the inner and outer flash. The ceramic sleeve and plug, which may be made of $AL_2O_3$, can be reused after the bonding operation.

Figure 42:
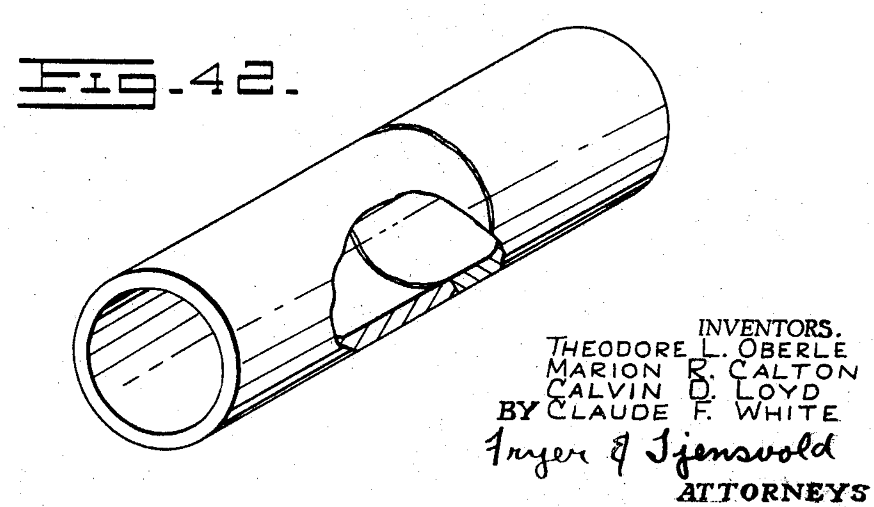
FIG. 42 is an isometric view of a product produced by the use of a ceramic collar and insert plug as illustrated in FIG. 41.

FIG. 42 illustrates the manner in which the inner and outer flash is smoothed by the use of a sleeve and plug as illustrated in FIG. 41.

Figure 43:
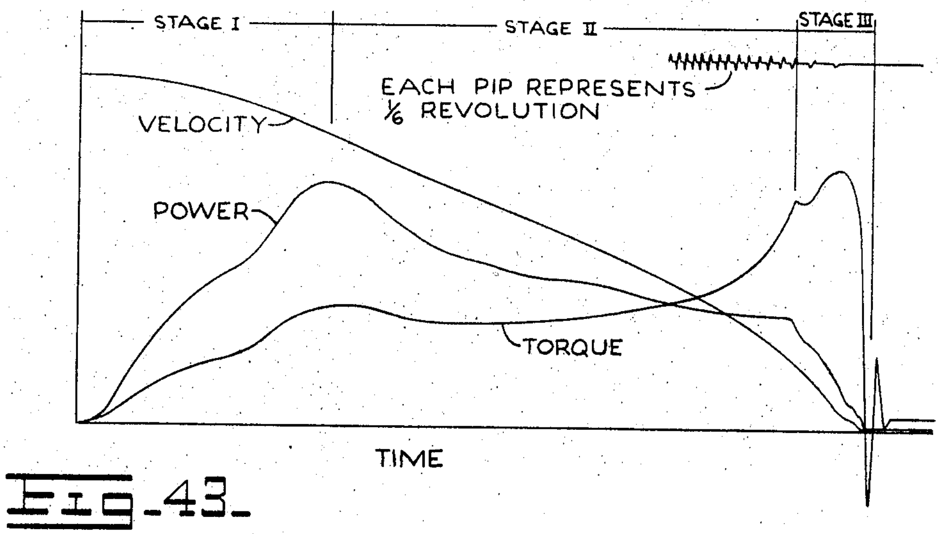
FIG. 43 is a plot of the torque and power curves for a typical bond cycle with steel bars and shows the three stages of the process of the present invention.

The process of the present invention can be considered as a three-stage process. The three stages are shown in FIG. 43 with reference to a plot of the power input and torque curves for a typical bond cycle in SAE 1040 type material. The first stage may be considered to be that part of the cycle from the beginning to the point at which the power is a maximum. The second stage may be considered to extend from the peak power input to a marked increase in torque and a marked decrease in power. The third stage extends from the transition from the second stage to the end of the cycle.

It is an important feature of the present invention that the process can supply whatever power is demanded by the rotating interface and the process can proceed to completion without the need to wait for the development of more energy at any stage during the process. The bond extracts the power needed by decelerating the flywheel at a faster speed. This permits the initial power peak to be developed quickly with only a small amount of energy input in the first stage.

In the first stage, after disruption of protective oxides of the surface has taken place, localized seizure and breaking of seizure areas occurs. The torque rises until the end of stage I as a result of increasing area of such surface contact seizure. In the present invention the parts can be engaged with a sufficiently high pressure and rate of pressure build-up to take the interface very rapidly to a peak power input. This peak power input may be as high as 195 horsepower per square inch of interface.

From this point onward the interface develops a stabilized plastic condition, and perhaps a smaller area of contact, in which less power is required to maintain the plastic condition. In this second stage the pressure, temperature and plastic conditions for bonding are believed to be present. However, the speed of rotation is above a critical speed at which the bond can form. There is a distinct interface during this second stage, whatever flash is produced is unjoined flash, and this stage acts as a safety valve to dissipate energy in excess of that required to bring the interface to a bondable temperature. The power absorbed by the interface balances that put into the parts until the speed is decreased to a critical speed at which the parts can bond under the forces applied.

As the velocity is decreased during the second stage there is believed to be a smooth transition from the second stage to the third stage. The third stage begins at a velocity of about 220 feet per minute when a steel part is bonded to another steel part. The duration of the third stage is contingent on the inertial mass of the flywheel. Large flywheels prolong the third stage. The magnitude of the third-stage torques indicates that a high strength bond has fully formed across the interface.

It is believed that the centers and near centers of bars are always in the third stage (assuming they have gone through the first stage) regardless of peripheral velocity. It is believed that there is no second stage at these locations. The third stage progresses from near the center outward as the velocity slows. In bonds between two steel parts the wave front between the second and third stage at any time is at a radius where the velocity is about 220 feet per minute. The rate of progression from the center is slow at the beginning and increases as it progresses outward, because the flywheel is being decelerated more rapidly with decreasing velocity.

With steel parts a rising torque and an outwardly moving rising power are produced in the portion of the interface moving at about 220 feet per minute. Thus, both the rising torque and localized rising power input sweep from near the center toward the periphery as the speed of the rotating flywheel decreases relatively slowly near the transistion from the second stage to the third stage. This changing speed tends to spread the area of maximum heating toward the periphery.

Evidence produced by tests indicates that the third stage torque itself is producing flash and supplying forging action to flush out oxide-contaminated interface material. The manner in which the high torque is applied during the third stage in the present invention develops much higher forging than would be produced under axial pressure alone. Thus, a four-time increase in axial pressure can increase the flash two to four times. But an eight-time increase in the $WK^2$ (pound feet squared) of the flywheel can produce about a 25% increase in torque and about a six-time increase in circumferential distance traveled in stage three, and in doing so increases the flash about fourty-four times. The use made of the third-stage torque in the present invention provides heavy plastic working which serves to refine the microstructure and completely eliminates the need to raise the axial pressure after rotation has stopped.

The effect of the third-stage torque in eliminating pores and cracks in the interface and in flushing oxides from the interface is well illustrated in FIGS. 28A and 28B. In both cases the parts were bonded under the same conditions except that the parts shown in FIG. 28B were rapidly disconnected from the torque input at the beginning of the third stage to eliminate substantially all torque and rotational working after the bond formed.

Stage three characteristics and the effects on the parts being bonded may be controlled by the size of the flywheel mass and related initial velocity. Since stage three appears to be initiated at a given critical velocity, the flywheel mass determines the amount of energy remaining in the system at that time. Variations in the amount of energy in the flywheel at the beginning of stage three may be used to control the length of stage three, the maximum torque achieved therein and the amount of circumferential working of the material in the heat affected zone.

The flywheel mass and initial velocity may be varied inversely over a wide range for a given total energy requirement in order that the process can be adapted for bonding of a wide range of materials having widely differing characteristics. This freedom of variation in the flywheel mass and initial velocity also permits control of the size and shape of the heat affected zone as well as control of the point of initial heat generation along the radius of a part being bonded. This permits selection of a flywheel size and initial velocity which will produce a satisfactory bond with a minimum amount of total energy. This also permits selection of a flywheel size, initial velocity and pressure which will minimize the time duration of the first and second stages and which will produce an extended third stage with a high torque. In some cases the second stage, as an observable condition, can be virtually eliminated by suitable selection of these parameters.

To obtain adequate forging action by the torque the parts should be rotated at least ¼ revolution. In many cases it will be desirable to rotate the parts about 1½ revolutions in the third stage. As shown by the pip marks indicating a sixth of a revolution in FIG. 43, about ½ revolution was produced in the third stage of the cycle illustrated.

Figure 45:
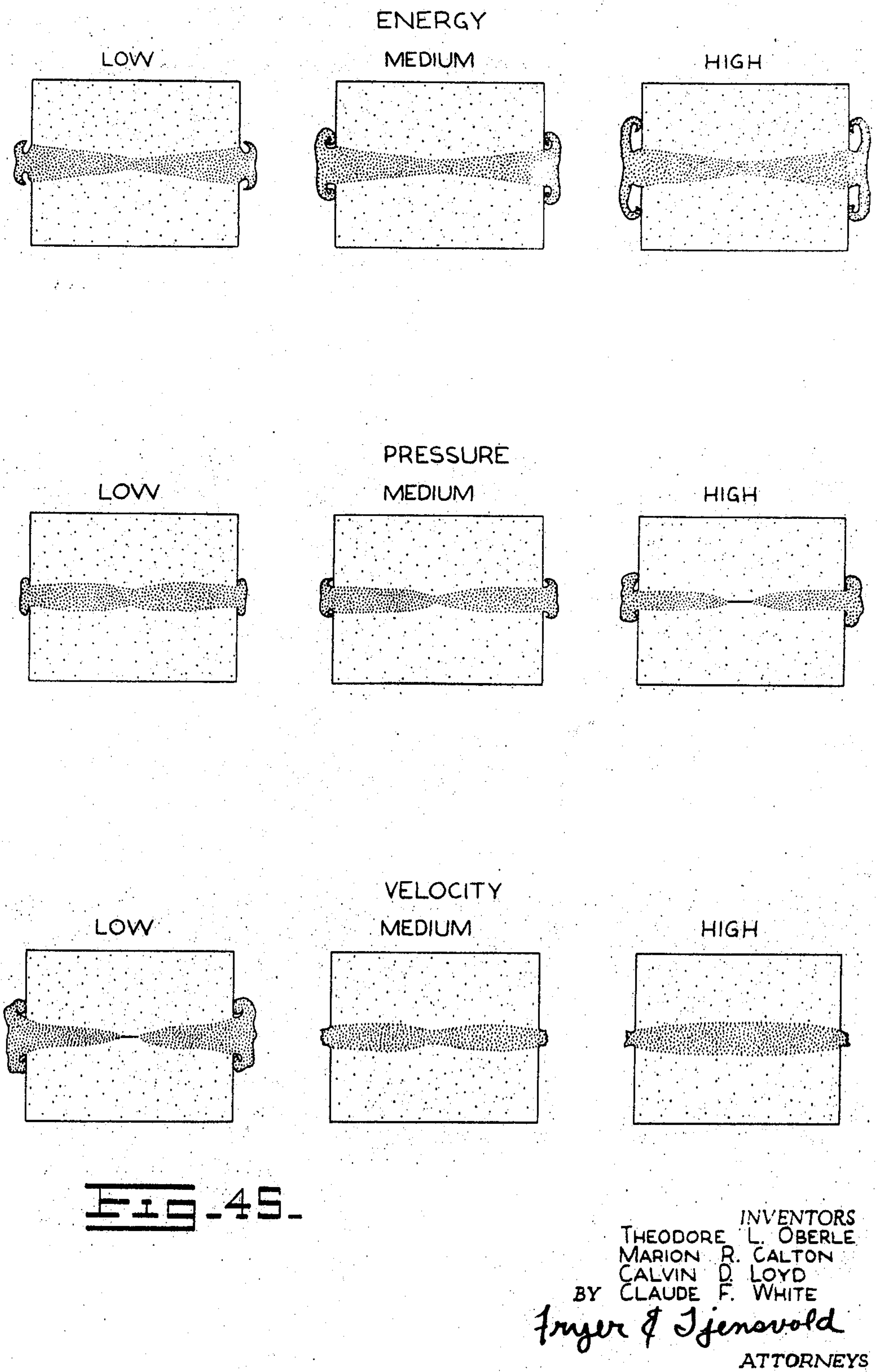
FIG. 45 shows bond patterns for various energy, load and speed conditions.

The effects of variations in three parameters of the process—pressure, energy, and speed—are best illustrated by having reference to FIG. 45 showing the weld patterns produced by variation of these parameters.

When the various factors influencing the bond (including material strength, practical size limits on the flywheel, and others) are taken into consideration, it is found that there are some practical limits on the commercially acceptable minimum and maximum initial speeds for initiating the bonding cycle of the present invention. As shown by the solid lines illustrated in FIG. 44 there is a lower limit of about 350 surface feet per minute and an upper limit of about 1000 surface feet per minute for bonds between two steel parts. These are practical limits for producing commercial products in which a fair amount of flash is desired for clean-up machining after bonding.

Figure 44:
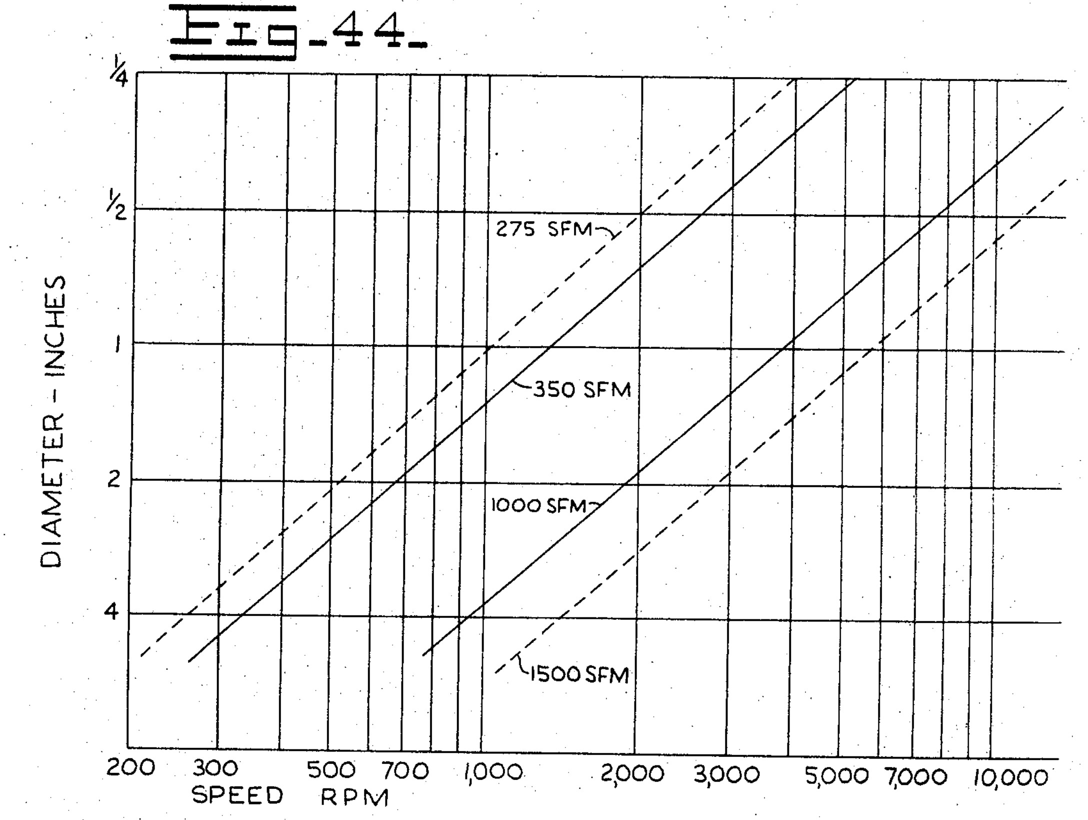
FIG. 44 is a chart showing upper and lower limits on the initial speed for different size steel bars.

As the rotary speed of a steel bar (at the instant of initial contact with another steel bar) is reduced to 275 surface feet per minute or less, as shown by the broken line in FIG. 44, three distinct things happen to signal that the lower speed limit has been reached. The measured torque rises sharply, twisted flash is observed and undercut appears near the weld. At speeds below 275 surface feet per minute it is difficult to prevent the pieces from kicking out of alignment. This speed is a lower limit below which it is quite difficult to produce acceptable bonds with any degree of success. The lower limit speed can be substantially lower when a steel part is bonded to some other material.

The heating pattern associated with the bond, although influenced by load and energy, is primarily a function of speed. Below an initial surface speed of about 300 surface feet per minute with steel parts the pattern is quite narrow, hour-glass in shape, and blurred at the center. At speeds between 300 and 800 surface feet per minute with steel parts the pattern has a pronounced hour-glass shape at the lower value and gradually becomes flat as the upper speed is approached. At speeds between 800 and 1000 surface feet per minute the pattern is essentially flat and uniform in thickness across the part. At speeds above 1000 surface feet per minute the weld becomes rounded, being thicker toward the center than at the surface. See FIG. 45.

Bonds made with steel parts below 300 surface feet per minute have recognizable features. The flash is very ragged and uneven and is parted or open to or below the surface. The torque developed at the end of the bond is significantly higher and the bond is still made smoothly and quietly with no squealing or chattering.

Above a certain energy input the effect of additional energy is to produce more flash with little change in the weld pattern. Insufficient energy results in a modification of the pattern at the center and outside surface through lack of heating at those points. The effect is not independent of speed.

The effect of load is also dependent on speed. At low speeds loads may be relatively low, at higher speeds loads must be significantly higher. Generally, higher loads flatten the curve (if rounded) and make it hour-glass in shape (if flat).

Empirical equations have been developed for solid steel bars to state the requirements for bonds so that a desired pattern can be obtained but are not necessary to an understanding of the invention and are not presented in this application.

At rotational speeds of 1500 surface feet per minute the efficiency of the welding process has so decreased that only about half the energy of the flywheel ends up in the weld. This contrasts poorly with the 300–600 surface feet per minute speed where efficiencies of over 95% have been observed.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claim.

We claim:

1. A method of welding two workpieces across a common interface comprising, storing an amount of energy sufficient to make the weld in a rotating inertial mass connected to one workpiece by tabs formed on the workpiece, engaging the workpieces in rotating rubbing contact and generating weld heat at the interface by discharging stored energy from the rotating inertial mass, and discontinuing the input of energy to the interface by disconnecting the rotating inertial mass from the workpiece by shearing off the tabs in response to a predetermined torque produced at the interface.

References Cited

UNITED STATES PATENTS

| | | | |
|---|---|---|---|
| 3,234,644 | 2/1966 | Hollander | 228—2 X |
| 3,269,002 | 8/1966 | Hollander et al. | 228—2 X |

JOHN F. CAMPBELL, *Primary Examiner.*